(12) United States Patent
Izumi et al.

(10) Patent No.: US 7,357,521 B2
(45) Date of Patent: Apr. 15, 2008

(54) CHROMATIC DISPERSION COMPENSATION DEVICE AND METHOD

(75) Inventors: Hirotomo Izumi, Kawasaki (JP);
Yuichi Kawahata, Kawasaki (JP);
Yasuhiro Hirose, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 138 days.

(21) Appl. No.: 10/793,647

(22) Filed: Mar. 5, 2004

(65) Prior Publication Data
US 2004/0184724 A1 Sep. 23, 2004

(30) Foreign Application Priority Data
Mar. 6, 2003 (JP) ............................. 2003-059555

(51) Int. Cl.
*G02B 5/04* (2006.01)
(52) U.S. Cl. .................. 359/615; 359/337.5; 359/721; 398/81; 398/147; 398/158
(58) Field of Classification Search .................... None
See application file for complete search history.

(56) References Cited

U.S. PATENT DOCUMENTS

| | | | | |
|---|---|---|---|---|
| 5,930,045 | A | 7/1999 | Shirasaki | 359/577 |
| 5,999,320 | A | 12/1999 | Shirasaki | 359/577 |
| 6,111,645 | A * | 8/2000 | Tearney et al. | 356/499 |
| 6,301,048 | B1 * | 10/2001 | Cao | 359/566 |
| 6,879,426 | B1 * | 4/2005 | Weiner | 359/279 |
| 2003/0128917 | A1 * | 7/2003 | Turpin et al. | 385/24 |

OTHER PUBLICATIONS

Hirotomo Izumi et al., "A Design of Numerical Simulation for Variable Dispersion Compensator Using Virtually Imaged Phased Array", *The Transactions of the Institute of Electronics, Information and Communication Engineers C*, vol. J85C, No. 10, pp. 898-905, Oct. 2002.
Patent Abstracts of Japan, Pub. No. 2003-015076.

* cited by examiner

*Primary Examiner*—Arnel Lavarias
(74) *Attorney, Agent, or Firm*—Staas & Halsey LLP

(57) ABSTRACT

A chromatic dispersion compensator whereby the amount of dispersion and the group delay time can be easily adjusted. A dispersion unit, a transmitting lens and a group delay generation unit are arranged along the optical axis of incident light. The dispersion unit separates the incident light into beams of respective different wavelengths. The transmitting lens is arranged across the optical paths of the beams of different wavelengths separated by the dispersion unit, and refracts the beams at different angles according to their respective incidence positions. The group delay generation unit is arranged across the optical paths of the beams of different wavelengths refracted by the transmitting lens, causes the beams to undergo propagation delay for periods corresponding to their respective incidence positions, and converges and emits the beams of different wavelengths. Consequently, the beams of different wavelengths are imparted group delay corresponding to the refracting angles of the transmitting lens.

12 Claims, 17 Drawing Sheets

CHROMATIC DISPERSION COMPENSATION DEVICE AND METHOD

BACKGROUND OF THE INVENTION (1) Field of the Invention

The present invention relates to a device and method for compensating for chromatic dispersion, and more particularly, to chromatic dispersion compensation device and method whereby the amount of dispersion can be set as desired.

(2) Description of the Related Art

In optical communication systems, signal degradation (chromatic dispersion) occurs as light pulses are propagated over a long distance through an optical fiber. Accordingly, such chromatic dispersion needs to be corrected to restore the optical signal to its original state.

Generally, a dispersion compensation fiber is used to correct chromatic dispersion. The dispersion compensation fiber has a fixed amount of dispersion, whereas the amount of chromatic dispersion of light pulses on a transmission path varies with time, depending on temperature change etc. With the dispersion compensation fiber, therefore, it is difficult to strictly compensate for the dispersion. Moreover, present-day large-capacity optical communication systems require extremely strict dispersion compensation techniques, and it is difficult to meet such requirements with the use of the dispersion compensation fiber.

In the circumstances, a chromatic dispersion compensation device of which the amount of dispersion can be set as desired has been devised. Such a dispersion compensation device will be hereinafter referred to as a VIPA (Virtually Imaged Phased Array) dispersion compensator.

FIG. 17 shows an example of a conventional VIPA dispersion compensator. The VIPA dispersion compensator comprises an optical circulator 911, an optical fiber 912, a collimating lens 913, a line focusing lens 914, a dispersion section 915, a line focusing lens 916, and a reflecting mirror section 917.

The dispersion section 915 includes a glass plate having a reflecting film with 100% reflectivity coated on an incidence side thereof except for the light incidence area and having a high-reflectivity reflecting film coated on a light emission side thereof (see Unexamined Japanese Patent Publication No. H09-43057, for example). The dispersion section 915 is slightly tilted with respect to the direction of incident light from the line focusing lens 914. The reflecting mirror section 917 comprises a mirror whose surface is curved in such a manner that concavity smoothly changes to convexity. In FIG. 17, the far side of the mirror constitutes a concave mirror, and the near side of same constitutes a convex mirror.

Light incident on the optical fiber 912 from the optical circulator 911 is propagated through the optical fiber 912 and then is turned into a parallel beam by the collimating lens 913. Subsequently, the parallel beam is focused by the line focusing lens 914 to be incident on the dispersion section 915.

The incident light undergoes multiple reflection within the dispersion section 915 and emerges therefrom. The emerging light behaves in the same manner as light emitted from a diffraction grating and therefore acts as diffracted light. This diffraction grating is not a real one but a virtual diffraction grating and is hence called a virtually imaged phased array (VIPA).

The diffracted light emitted in this manner has various orders of diffraction, and the following description is directed only to required orders (hereinafter "diffracted light"). The diffracted light is focused on the reflecting mirror section 917 by the line focusing lens 916. At this time, light waves of different wavelengths are focused at different locations on the reflecting mirror section 917. The focused light waves are reflected in various directions by the reflecting mirror section 917, then pass through the line focusing lens 916 and again reach the dispersion section 915. At this time, the light waves of different wavelengths arrive at different locations on the dispersion section 915. Consequently, the light waves require different periods of time to again reach the window of the light incidence side after undergoing multiple reflection within the dispersion section 915, thus producing group delay time.

By moving the reflecting mirror section 917 in the X-axis direction, it is possible to adjust the incidence positions of the reflected light on the dispersion section 915, namely, to adjust the group delay time (see Unexamined Japanese Patent Publication No. 2003-15076, and "Design for VIPA variable dispersion compensator simulator" by Hirotomo Izumi, Yasuhiro Yamauchi, and Yuichi Kawabata, Journal C of The Institute of Electronics, Information and Communication Engineers, Vol. J85-C, No. 10, pp. 898-905, October 2002, for example).

In the conventional dispersion compensator, however, a single dispersion section functions as both a dispersion element and a delay element, and accordingly, optical adjustment is made taking account of the balance of the dispersion function and the delay function. This means that two parameters are adjusted by means of a single parameter, and thus there is no guarantee that both of the characteristics can always be optimized. Namely, if the optical system is adjusted so as to obtain a desired dispersion function, then the delay function may possibly fail to attain a desired value. Similarly, if the optical system is adjusted so as to obtain a desired delay function, the dispersion function may possibly fail to attain a desired value. Thus, in the conventional dispersion compensator, the dispersion function and the delay function are performed by a common optical system, and this makes it difficult to attain an optimum dispersion compensation function.

SUMMARY OF THE INVENTION

The present invention was created in view of the above circumstances, and an object thereof is to provide chromatic dispersion compensation device and method whereby the amount of dispersion and the group delay time can be adjusted with ease.

To achieve the object, there is provided a chromatic dispersion compensation device for compensating for chromatic dispersion. The chromatic dispersion compensation device comprises a dispersion unit for separating incident light into light beams of respective different wavelengths, a transmitting lens arranged across optical paths of the light beams of the different wavelengths separated by the dispersion unit, for refracting the light beams of the different wavelengths at different refracting angles according to respective incidence positions of the light beams of the different wavelengths, and a group delay generation unit arranged across optical paths of the light beams of the different wavelengths refracted by the transmitting lens, for causing the light beams of the different wavelengths to undergo propagation delay for time periods corresponding to respective incidence positions, and converging and emitting the light beams of the different wavelengths.

Also, to achieve the above object, there is provided a chromatic dispersion compensation method for compensating for chromatic dispersion. The chromatic dispersion compensation method comprises the step of separating incident light into light beams of respective different wavelengths, the step of refracting, by means of a transmitting lens arranged across optical paths of the separated light beams of the different wavelengths, the light beams of the different wavelengths at different refracting angles according to respective incidence positions of the light beams of the different wavelengths, and the step of causing the light beams of the different wavelengths to undergo propagation delay for time periods corresponding to the respective refracting angles of the transmitting lens.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIGS. 13A and 13B exemplify angles of refraction according to incident positions of light on the transmitting lens, wherein FIG. 13A is a perspective view of the transmitting lens, and FIG. 13B is a side view of the transmitting lens.

FIGS. 16A and 16B illustrate a VIPA variable dispersion compensator according to a third embodiment of the present invention, wherein FIG. 16A is a diagram showing an entire arrangement, and FIG. 16B is an enlarged view of a transmitting lens driving section.

DESCRIPTION OF THE PREFERRED EMBODIMENTS

Embodiments of the present invention will be hereinafter described with reference to the drawings.

First Embodiment

Figure 1:
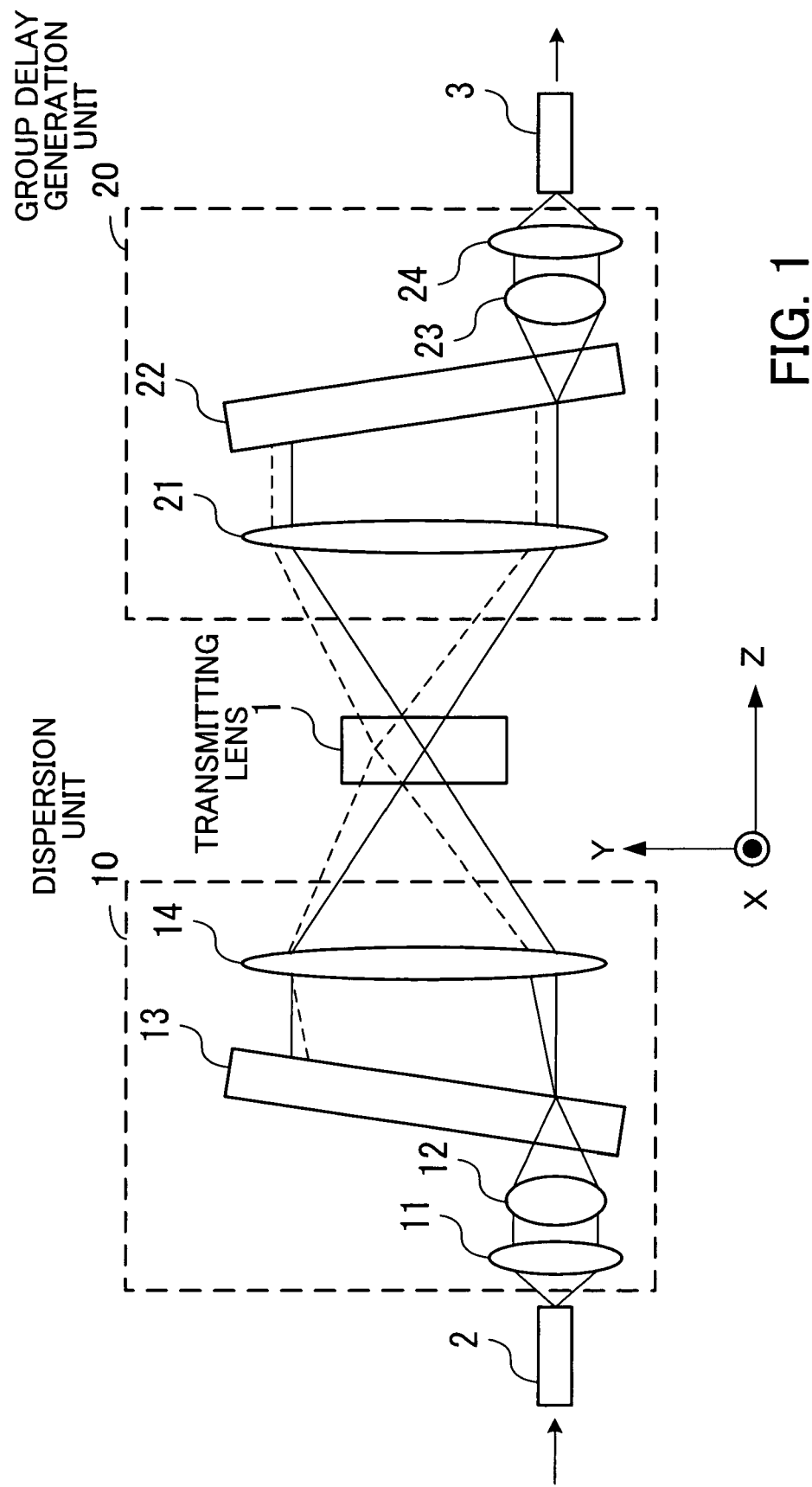
FIG. 1 is a diagram showing an arrangement of a VIPA variable dispersion compensator according to a first embodiment of the present invention.

FIG. 1 shows an arrangement of a VIPA variable dispersion compensator according to a first embodiment of the present invention. The VIPA variable dispersion compensator of the first embodiment comprises a dispersion unit 10 and a group delay generation unit 20 which are so arranged as to be in the relationship of mirror symmetry with respect to a transmitting lens 1. Compared with the conventional VIPA variable dispersion compensator, the transmitting lens 1 is used in place of the reflecting mirror section and two optical devices, namely, the dispersion unit 10 and the group delay generation unit 20, are arranged on both sides of the transmitting lens 1.

The dispersion unit 10, the transmitting lens 1 and the group delay generation unit 20 are arranged along the optical path of light incident on the VIPA variable dispersion compensator. In FIG. 1, X axis indicates the direction from the far side to near side in the figure, Y axis indicates the bottom-to-top direction in the figure, and Z axis indicates the left-to-right direction in the figure. In the illustrated example, the incident light enters the compensator in a direction from the negative side to positive side of the Z axis.

Specifically, the dispersion unit 10 includes a first collimating lens 11, a first line focusing lens 12, a dispersion section 13 and a first focusing lens 14 arranged in the order mentioned from the side of an optical fiber 2 toward the transmitting lens 1. The first collimating lens 11 collimates (obtains a parallel beam from) light emerging from the optical fiber 2. The first line focusing lens 12 focuses the collimated light into a line segment of light within an incidence window of the dispersion section 13. The first collimating lens 11 and the first line focusing lens 12 constitute a collimating lens section.

The dispersion section 13 comprises a transparent parallel flat plate such as a glass plate, a reflecting film with 100% reflectivity coated on a light incidence side of the flat plate except for the incidence window-, and a reflecting film with high reflectivity (e.g., about 95 to 98%) coated on an emission side of the flat plate. The parallel flat plate may be transparent only to that wavelength band of light with respect to which the VIPA variable dispersion compensator is used. The first collimating lens 11, the first line focusing lens 12 and the first focusing lens 14 have their incidence planes directed substantially perpendicularly to the optical axis (parallel to the Z axis) of the incident light, but the dispersion section 13 is tilted relative to the optical axis.

The first focusing lens 14 focuses diffracted light from the dispersion section 13 on a straight line (parallel to the Y axis) where the transmitting lens 1 is arranged.

The transmitting lens 1 is an aspherical lens made of a material which is transparent to the wavelength band used. The transmitting lens 1 has an optical characteristic whereby light is refracted in a manner such that the light incident thereon from the dispersion unit 10 is emitted at an angle identical with that at which light is reflected by the reflecting mirror used in the conventional VIPA variable dispersion compensator (the light is, however, emitted in an opposite direction, i.e., on the positive side of the Z axis).

For example, the transmitting lens 1 has an optical characteristic such that, when the light incidence position is shifted in the X-axis direction with the Y coordinate value unchanged, the refracting angle changes continuously (or stepwise). Specifically, the near side of the transmitting lens 1, as viewed in FIG. 1, has a sectional form showing an optical characteristic similar to that of a diverging lens (concave lens) and the far side of the lens 1 has a sectional form showing an optical characteristic similar to that of a converging lens (convex lens). By moving the transmitting lens 1 having such a shape in the X-axis direction, it is possible to shift the incidence position on the incidence plane of the transmitting lens 1, and consequently, to control the degree of divergence or convergence of the incident light. Namely, the transmitting lens 1 can function as the reflecting mirror of the conventional VIPA variable dispersion compensator.

The group delay generation unit 20 includes a second focusing lens 21, a delay section 22, a second line focusing lens 23 and a second collimating lens 24 arranged in the order mentioned from the side of the transmitting lens 1 toward an optical fiber 3. The second focusing lens 21 turns a plurality of diffracted light beams of respective different wavelengths, emitted from the transmitting lens 1, to parallel beams of light.

The delay section 22 comprises a parallel flat plate transparent to the wavelength band used, such as a glass plate, a reflecting film with high reflectivity (e.g., about 95 to 98%) coated on a light incidence side of the flat plate, and a reflecting film with 100% reflectivity coated on a light emission side of the flat plate except for an emission window. The second focusing lens 21, the second line focusing lens 23 and the second collimating lens 24 have their incidence planes directed substantially perpendicularly to the optical axis (parallel to the Z axis) of the incident light, but the delay section 22 is tilted relative to the optical axis.

The second line focusing lens 23 turns the light emerging from the delay section 22 into a parallel beam of light. The second collimating lens 24 focuses the collimated light on the core of the optical fiber 3. The second collimating lens 24 and the second line focusing lens 23 constitute a collimating lens section.

In the VIPA variable dispersion compensator constructed as described above, light is made incident on the dispersion unit 10 from the optical fiber 2. Then, in the dispersion unit 10, the incident light is dispersed according to wavelengths and focused on the transmitting lens 1 in a straight line parallel to the Y axis. At this time, the light beams of respective different wavelengths are focused at positions ("bright" fringe positions in the interference fringes) shifted in the Y-axis direction according to their wavelengths.

Specifically, the light focused on the dispersion section 13 by the collimating lens section emerges only from the emission side of the dispersion section without leaking from the incidence side, because the incidence side of the dispersion section 13 except the incidence window is coated with a film having 100% reflectivity while the emission side of same is coated with a film having a different but high reflectivity. At this time, the incident light undergoes multiple reflection inside the dispersion section 13 and gradually emerges therefrom; accordingly, the dispersion section behaves in the same manner as a diffraction grating. The dispersion section 13 has interference conditions imposed on light beams to be emitted in respective directions, and light beams satisfying the interference conditions are dispersed and emitted in their respective directions. Also, the dispersion section 13 has a thickness designed such that the FSR (Free Spectral Range) thereof matches the wavelength spacing used in a WDM (Wavelength Division Multiplexing) optical communication system, and accordingly, the necessary light is allowed to pass through the dispersion section.

The light beams emitted from the dispersion section 13 impinge on the first focusing lens 14 at different angles according to their respective wavelengths and are focused by the lens 14. In this case, the light beams are focused into a straight line on a plane parallel to a direction (Y-axis direction) perpendicular to the optical axis but at different positions on the straight line according to their respective wavelengths. The transmitting lens 1 is arranged on the straight line where the light beams of different wavelengths are focused, so that the focused light beams of different wavelengths are incident on different positions of the transmitting lens 1.

The transmitting lens 1 refracts the input light and emits the refracted light to the group delay generation unit 20. Specifically, the light beams focused into a straight line parallel to the Y axis are refracted at different refracting angles according to their respective focusing positions, and the refracting angles are designed such that the final group delay time characteristic shows a linear function.

In this case, the transmitting lens 1 exhibits different lens characteristics (refracting angles) with respect to the incident light beams, depending on where along the X axis the light beam enters the lens 1. When the light beams are incident on a position where the transmitting lens has an optical characteristic similar to that of a diverging lens, the light beams of respective different wavelengths enters the group delay generation unit 20 at large incidence intervals. When the light beams are incident on a position where the transmitting lens has an optical characteristic similar to that of a converging lens, the light beams of respective different wavelengths enters the group delay generation unit 20 at small incidence intervals. Where the degree of convergence is greater than a certain level, the incidence positions of the light beams of respective wavelengths on the group delay generation unit 20 are inverted along the Y axis. If the degree of convergence is even greater, the incidence intervals of the respective wavelengths become large.

The group delay generation unit 20 subjects the incident light beams to group delay according to their respective incidence positions and outputs the resultant light to the optical fiber 3. Namely, the larger the incidence intervals of the respective wavelengths, the larger group delay time differences are produced among the respective wavelengths. The incidence positions on the group delay generation unit 20 are dependent on the refracting angles of the transmitting lens 1, and therefore, the light beams of different wavelengths are subjected to respective different propagation delays corresponding to the refracting angles of the transmitting lens 1.

Specifically, the light beams refracted in a direction parallel to the optical axis by the transmitting lens 1 are propagated to the second focusing lens 21. The second focusing lens 21 passes the incoming light beams therethrough to turn same to parallel beams, which are then emitted to the delay section 22. The delay section 22 satisfies the interference conditions for the light beams emitted from the dispersion section 13, and accordingly, the light beams incident on the delay section 22 undergo multiple reflection within the delay section 22 and emerge from the emission window in linear form. The number of times the light beams are reflected varies depending on the wavelengths, and accordingly, the light beams of different wavelengths require different periods of time to reach the emission window of the delay section 22. It is therefore possible to produce chromatic dispersion.

In the conventional VIPA dispersion compensator, the dispersion function and the delay line function are adjusted by means of a single dispersion section, but with the aforementioned arrangement, these functions can be separately adjusted by means of the dispersion section and the delay section, thus making it possible to improve the characteristics of the compensator. Namely, the dispersion section 13 disperses light and the delay section 22 subjects the light to group delay for propagation, so that the dispersion and the group delay can be adjusted independently of each other. For example, after the thickness and incidence angle of the dispersion section 13 are adjusted so as to obtain an optimum dispersion function, the delay time (plate thickness or incidence angle) of the delay section 22 can be adjusted without taking account of lowering of the dispersion function. Since the dispersion function and the delay function can be adjusted independently of each other, the characteristics of the compensator can be adjusted with ease.

The behavior of light input to the VIPA variable dispersion compensator will be now described in more detail.

Figure 2:
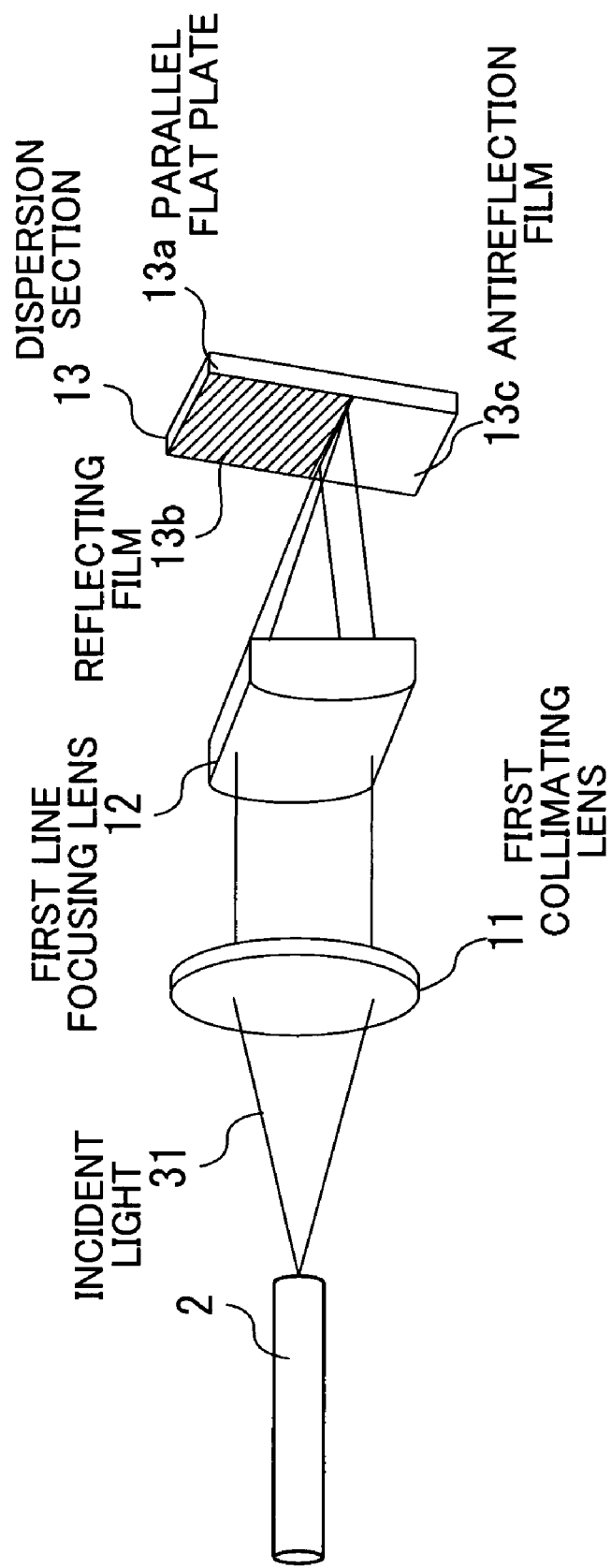
FIG. 2 is a diagram showing the manner of how incident light is propagated up a dispersion section.

FIG. 2 shows the manner of how incident light is propagated to the dispersion section. The dispersion section 13 has a parallel flat plate 13a and a reflecting film 13b affixed to an upper part of the incidence side (left side in FIG. 2) of the flat plate. The reflecting film 13b has a reflectivity of nearly 100%. An incidence window is located on the incidence side below the reflecting film 13b and is affixed with an antireflection film 13c having a reflectivity of nearly 0% and thus capable of transmitting light therethrough. The antireflection film 13c may be an AR (Anti Reflection) coat, for example. The boundary between the reflecting film 13b and the antireflection film 13c is in the form of a straight line. Also, the emission side (right side in FIG. 2) of the parallel flat plate 13a is affixed with a reflecting film having high reflectivity (e.g., 95 to 98%) and capable of transmitting only a small amount of light therethrough.

Incident light 31 emitted from the optical fiber 2 enters the first collimating lens 11. The first collimating lens 11 turns the incident light 31 into parallel light, which is then emitted to the first line focusing lens 12. The parallel incident light 31 is focused by the first line focusing lens 12 into a straight line in the vicinity of the boundary between the reflecting film 13b on the antireflection film 13c formed on the surface of the dispersion section 13 and the antireflection film 13c.

Figure 3:
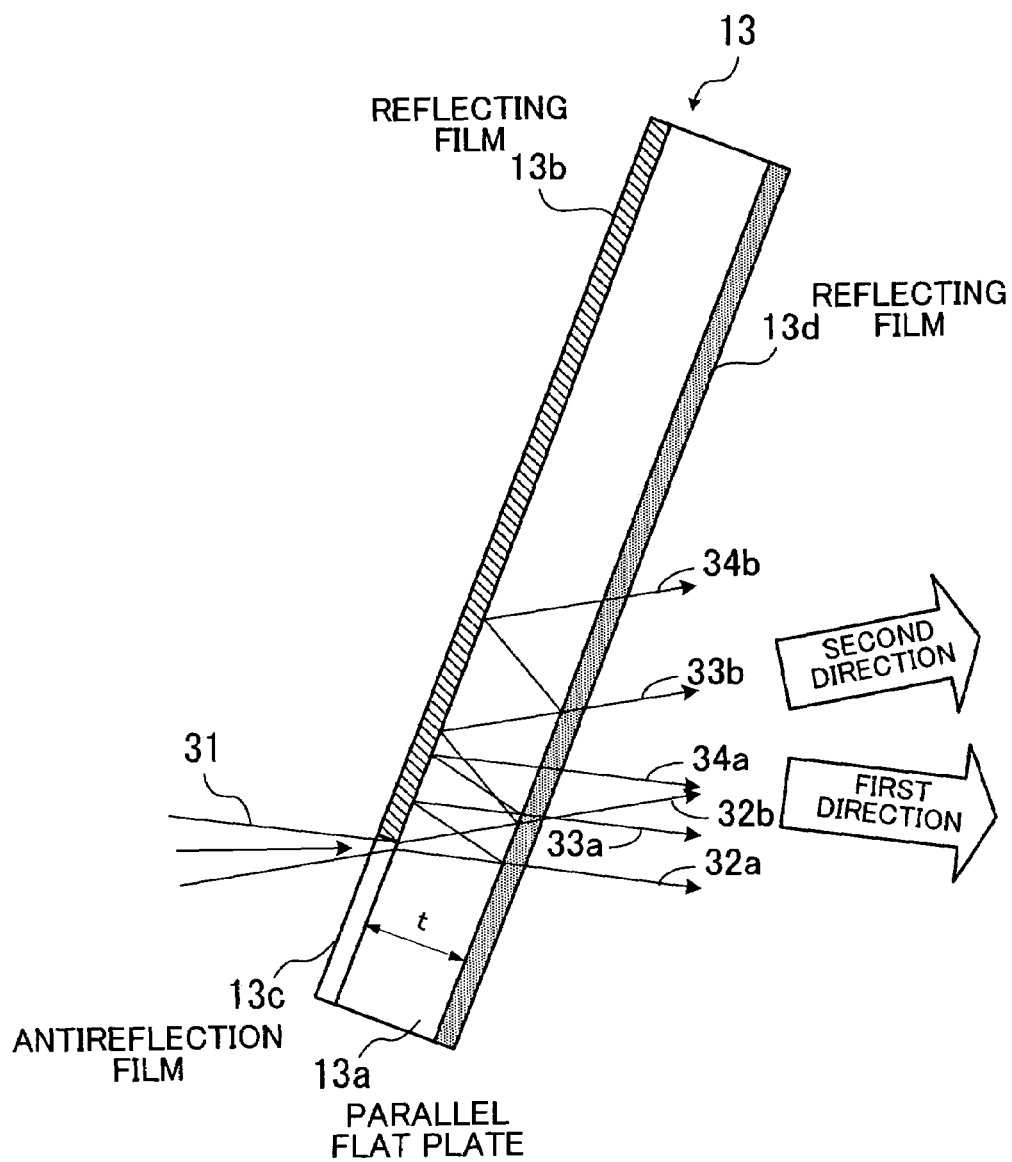
FIG. 3 is a diagram showing the propagation of light within the dispersion section.

FIG. 3 shows the propagation of light within the dispersion section 13. The dispersion section 13 is constituted by the parallel flat plate 13a (with a thickness of t), the reflecting film 13b, the antireflection film 13c and a reflecting film 13d, as mentioned above.

The incident light 31 is focused (on the antireflection film 13c) in the vicinity of the boundary between the reflecting film 13b and the antireflection film 13c on the incidence side, whereupon the incident light 31 transmits through the parallel flat plate 13a while dispersing therein. Some light beams 32a, 32b pass through the reflecting film 13d to outside while the other light beams are reflected by the reflecting film 13d. The reflected light beams are then reflected by the reflecting film 13b and again reach the reflecting film 13d, whereupon some light beams 33a, 33b pass through the reflecting film 13d to outside while the other light beams are reflected by the reflecting film 13d. The reflected light beams travel back and forth within the parallel flat plate 13a and some light beams 34a, 34b pass through the reflecting film 13d to outside.

In FIG. 3, two directions (first direction, second direction) are illustrated as directions in which beams of light (light beams) are emitted on reaching the reflecting film 13d. In practice, light beams are emitted in various directions within a predetermined angular range including the illustrated directions.

As shown in FIG. 3, the incident light 31 is emitted while being subjected to multiple reflection within the parallel flat plate 13a, so that the dispersion section 13 can be imparted a dispersion function similar to that of a diffraction grating. Namely, interference fringes (spectrum) of the respective wavelengths are produced at infinity.

The emergence angles of interference light beams of respective wavelengths are determined by the optical path differences resulting from the back-and-forth traveling of the light beams inside the parallel flat plate 13a. For example, in the case of the light beams 32a and 33a (emitted in the first direction), the optical path of the light beam 33a is longer by an amount corresponding to one back-and-forth travel within the parallel flat plate 13a. Provided this optical path difference is an integer multiple of the wavelength of a light beam contained in the incident light 31, when the light beams 32a and 33a are focused by a convex lens (focusing lens 14), the focused position constitutes a bright fringe in the interference fringes. At the bright fringe, only light beams with wavelengths satisfying the interference condition are focused.

The light beams 32b and 33b (emitted in the second direction) also produce interference light. The light beam 32b is incident on the reflecting film 13d at a larger incidence angle (angle formed between the incident light beam and the normal line normal to the reflecting surface 13d) than the light beam 32a. Accordingly, the optical path difference between the light beams 32b and 33b (second direction) is smaller than that between the light beams 32a and 33a (first direction), so that the light beams emitted in the second direction produce interference light of wavelengths different from those of the light beams emitted in the first direction. Thus, the optical path difference varies depending on the direction of emission of light, and also the wavelengths of light beams producing interference light (bright fringe) vary depending on the emission direction, causing chromatic dispersion as a result. The dispersed light is propagated to the group delay generation unit 20 through the transmitting lens 1.

Figure 4:
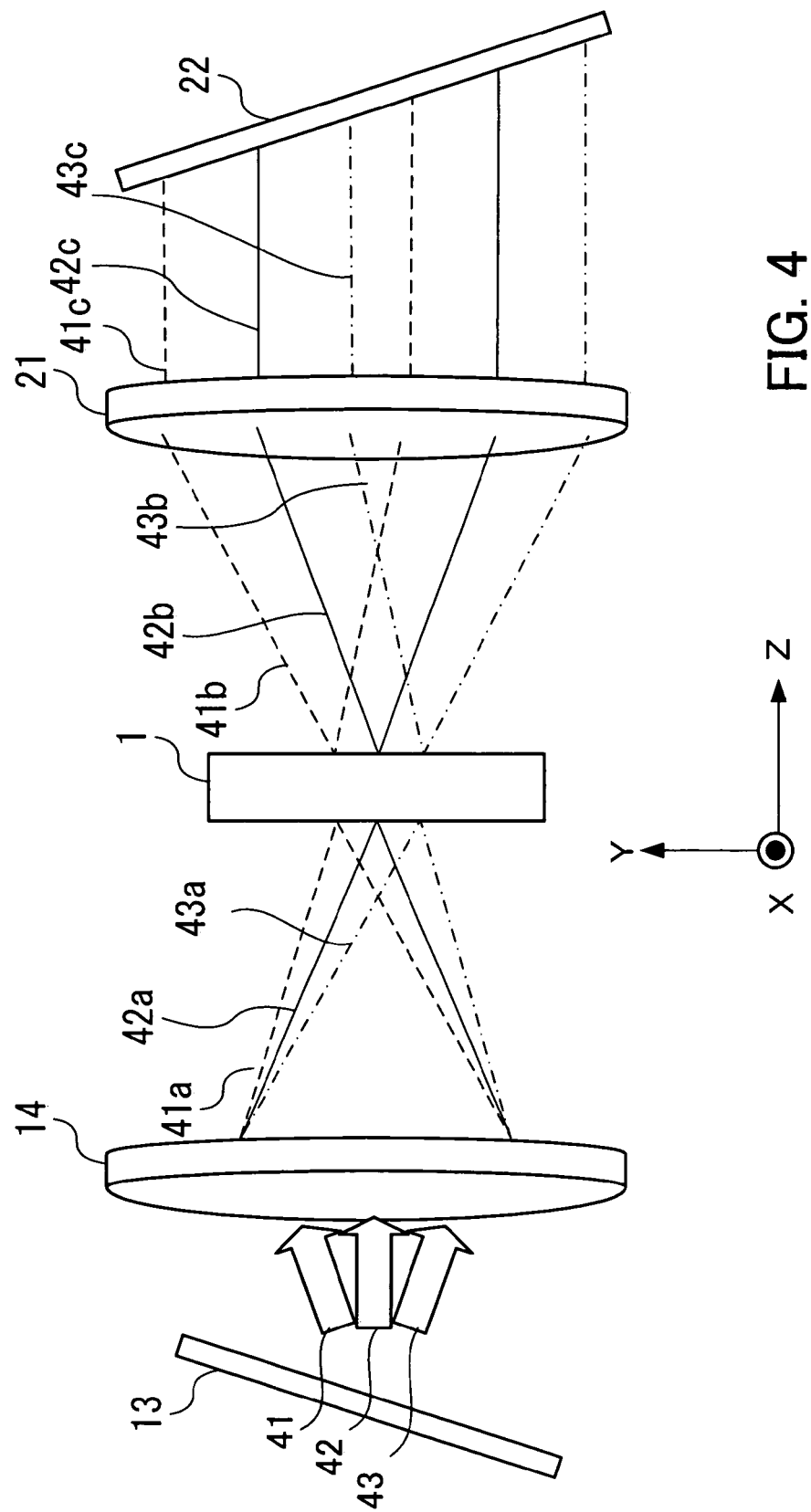
FIG. 4 is a diagram showing the manner of how light is propagated from a dispersion optical system to a group delay optical system.

FIG. 4 shows the manner of how light is propagated from the dispersion optical system to the group delay optical system. In FIG. 4, the light emitted from the dispersion section 13 is indicated by light beams 41 to 43 according to their respective emission directions. The light beams 41 to 43 are focused by the first focusing lens 14 on the transmitting lens 1.

The light beam 41 is propagated in an obliquely upward direction (positive direction of both Y and Z axes) to be incident on the first focusing lens 14, then converged by the first focusing lens 14, and focused on an upper part of the transmitting lens 1 as a light beam 41a. The light beam 42 is propagated in a horizontal direction (parallel to the Z axis) to be incident on the first focusing lens 14, then converged by the first focusing lens 14, and focused on the center of the transmitting lens 1 as a light beam 42a. The light beam 43 is propagated in an obliquely downward direction (negative direction of the Y axis and positive direction of the Z axis) to be incident on the first focusing lens 14, then converged by the first focusing lens 14, and focused on a lower part of the transmitting lens 1 as a light beam 43a.

A plurality of wavelengths contained in each of the light beams 41 to 43 interfere with one another while being propagated. Thus, in each of the light beams 41 to 43, only the components of light with wavelengths satisfying the interference condition intensify their brightness, while the components of light with other wavelengths darken. As a result, when each of the light beams 41a, 42a and 43a is focused on the transmitting lens 1, only the components of light with the wavelengths satisfying the interference condition for a bright fringe constitute a bright fringe at the focused position. The light beams 41a to 43a are propagated thereafter as light beams with the wavelengths satisfying the respective interference conditions.

The light beams 41a, 42a and 43a focused on the transmitting lens 1 are diverged or converged by the lens 1 to be incident on the second focusing lens 21 as light beams 41b, 42b and 43b, respectively. The larger the degree of divergence (or the smaller the degree of convergence) of the transmitting lens 1, the higher the incidence position of the light beam 41b shifts and the lower the incidence position of the light beam 43b shifts. Also, the smaller the degree of divergence (or the larger the degree of convergence) of the transmitting lens 1, the lower the incidence position of the light beam 41b shifts and the higher the incidence position of the light beam 43b shifts.

The light beams 41b, 42b and 43b incident on the second focusing lens 21 are turned into parallel light beams 41c, 42c and 43c, respectively, by the lens 21 to be incident on the delay section 22.

Figure 5:
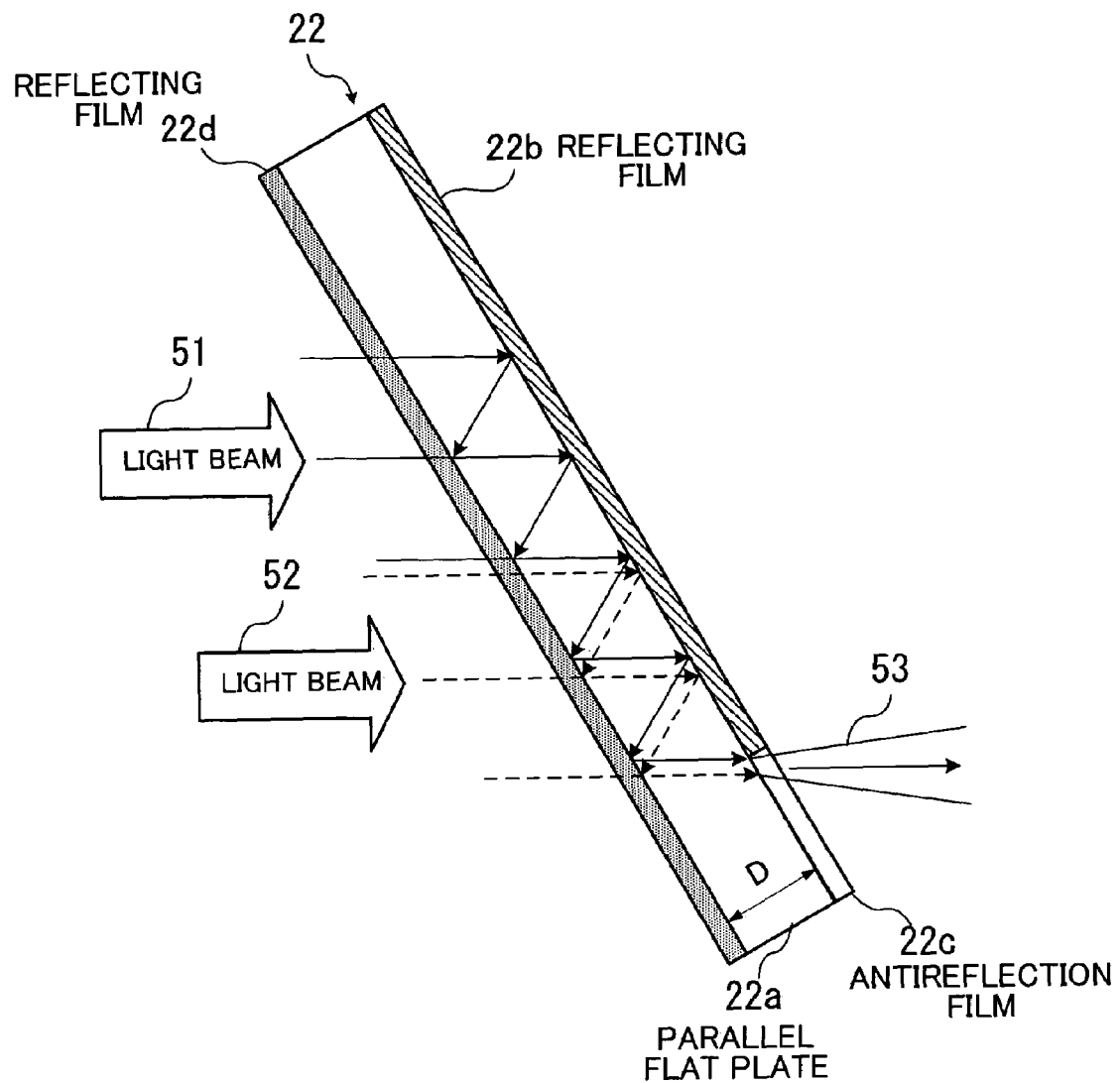
FIG. 5 is a diagram showing the manner of how light is propagated through a delay section.

FIG. 5 shows the manner of how light is propagated through the delay section. The delay section 22 has a construction identical with that of the dispersion section 13 but the incidence and emission sides are reversed. Specifically, a reflecting film 22b with 100% reflectivity is affixed to an upper part of the emission side of the parallel flat plate 22a, and an antireflection film 22c capable of transmitting light therethrough is affixed to an emission window located below the reflecting film 22b. The incidence side is affixed with a reflecting film 22d having high reflectivity (e.g., 95 to 98%) and thus capable of transmitting only a small amount of light.

The delay section 22 satisfies the interference conditions for the wavelengths of light beams 51, 52 incident thereon. If the dispersion section 13 and the delay section 22 are tilted at the same angle (but in opposite directions), the thickness D of the delay section 22 should be t, or 2×N×t, where N is an integer greater than or equal to "1" and t is the thickness of the dispersion section 13. Where the dispersion section 13 has an FSR of 100 GHz, for example, the delay section 22 may have an FSR for 50 GHz or 25 GHz, so that the interference conditions for output light can be satisfied.

The delay section 22 is tilted with respect to the direction of incoming light so that light incident on the upper part of the delay section, which is affixed with the reflecting film 22b, may be propagated downward toward the antireflection film 22c serving as the emission window.

The light beams 51, 52 with different wavelengths are incident on the delay section 22. In the example shown in FIG. 5, the light beam 51 enters the delay section at a higher position than the light beam 52. The incident light beams 51, 52 are propagated within the parallel flat plate 22a while being repeatedly reflected between the reflecting films 22b and 22d. On arrival at the antireflection film 22c, the light beams 51, 52 are emitted through the film 22c. The emitted light 53 contains components with a plurality of wavelengths.

Since the incidence positions of the light beams 51 and 52 are different from each other, the light beams need to be propagated over different distances until they reach the emission position. Because of the difference in the distance, propagation delay occurs, thus producing group delay times for respective wavelengths.

The emitted light 53 is incident on the second line focusing lens 23 and turned into parallel light. The parallel light 53 is then focused by the second collimating lens 24 to be incident on the optical fiber 3.

The dispersion unit 10 and the group delay generation unit 20 are separately provided as mentioned above, and accordingly, the chromatic dispersion characteristic can be adjusted separately from the group delay time characteristic. As a result, the VIPA variable dispersion compensator can be easily adjusted so that the chromatic dispersion and the group delay time may be greatest.

In the dispersion unit 10, for example, the light dispersion characteristic may be precisely adjusted so that the propagated light may clearly show interference fringes of desired orders. Also, since the dispersion characteristic can be set without regard to the group delay time, the dispersive power (ratio of change in dispersion angle (diffraction angle) to change in wavelength λ) can be easily made to be extremely large, or conversely, be small.

The group delay generation unit 20 may be adjusted taking account of only the group delay time of input light, and thus can be adjusted to have a characteristic such that an extremely long group delay time is generated. For example, since the delay section 22 may have a thickness different from that of the dispersion section 13, the thickness of the delay section 22 may be increased to thereby increase the group delay time. The delay section 22 needs to fulfill the interference conditions for output light. Accordingly, the thickness of the delay section 22 should be equal to the thickness t of the dispersion section 13 or be 2n times as large as t.

Also, the amount of the group delay time of the VIPA variable dispersion compensator can be adjusted by shifting the position along the X axis of the transparent transmitting lens 1 arranged at the center. How long the group delay time needs to be set depends on the transmission path over which light has been propagated before being input to the VIPA variable dispersion compensator. Accordingly, when the VIPA variable dispersion compensator is connected to the transmission path, the technician adjusts the position of the transmitting lens 1 along the X axis so that a desired group delay time may be generated.

A design method for the transmitting lens 1 capable of controlling the group delay time will be now described. The refractive indices at respective incidence positions of the transmitting lens 1 are determined in accordance with the group delay times to be generated for respective wavelengths (so that the group delay time characteristic may show a linear function, for example). Thus, the optical characteristic of the transmitting lens 1 is not so simple as in the case of an optical element having a single focal point. The following describes in detail the design method for the transmitting lens 1.

First, the behavior of light in the dispersion section 13 will be considered.

Figure 6:
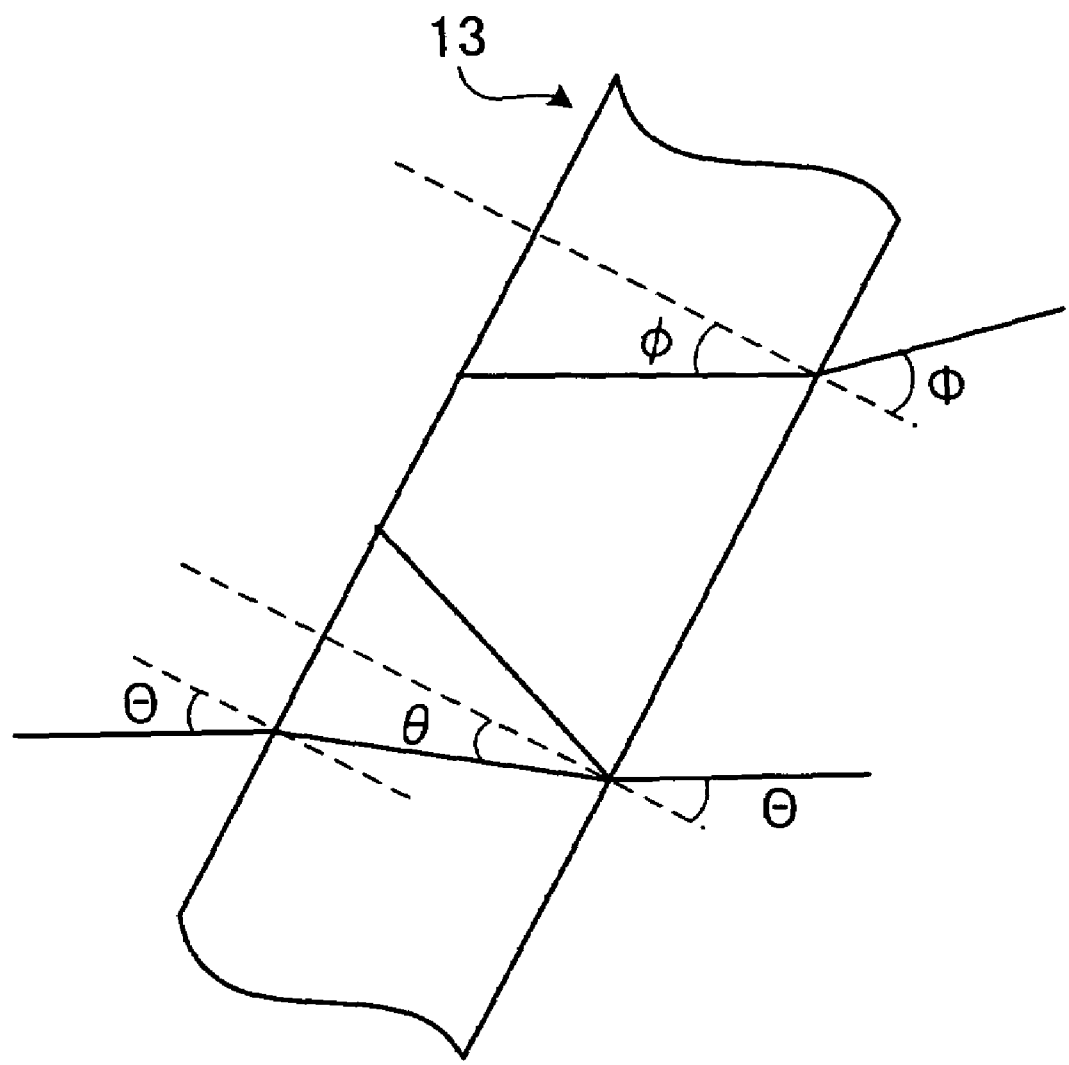
FIG. 6 is a diagram showing the behavior of light within the dispersion section.

FIG. 6 shows the behavior of light within the dispersion section. In the following, θ represents the incidence angle of light incident on the dispersion section 13 and n represents the refractive index of the parallel flat plate 13*a* of the dispersion section 13. Provided the emergence angle is θ, the relationship of $$\sin\theta = n\sin\theta \quad (1)$$

stands in accordance with Snell's law. The incidence angle is small and thus linearly approximated, then $$\theta \approx n\theta \quad (2)$$

Light undergoes repeated multiple reflection within the dispersion section 13 while enlarging its beam diameter. This behavior of light is equivalent to that of light emitted from a transmission-type step diffraction grating; therefore, the section 13 acts as a dispersion unit. Consequently, light beams are emitted from the dispersion section 13 in a manner dispersed according to respective different wavelengths.

The behavior of light at the time of emission will be now considered. Provided Φ is an angle at which light is emitted from the dispersion section 13 and φ is an incidence angle of light to the reflecting film 13*d* when the light emerges from the dispersion section 13, then $$n\sin\phi = \sin\Phi \quad (3)$$

stands according to Snell's law. This equation is approximated, like (2), then $$n\phi \approx \Phi \quad (4)$$

The following focuses on two points concerning the virtually imaged phased array (virtual diffraction grating).

Figure 7:
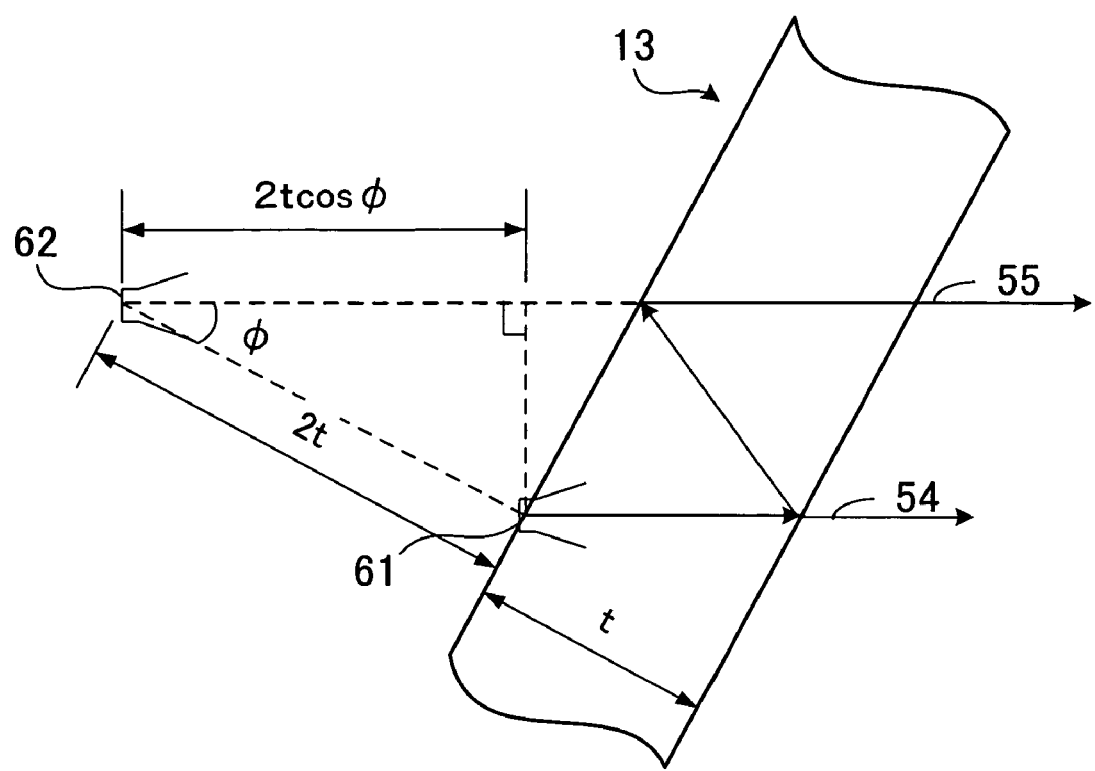
FIG. 7 is a diagram illustrating the principles of a virtual diffraction grating.

FIG. 7 illustrates the principles of such a virtual diffraction grating. In FIG. 7, comparison is made between a light beam 54 which is output without being reflected even once and a light beam 55 which is output after making one back-and-forth travel due to reflection within the dispersion section 13. When observed from the emission side, the light beam 54 is equivalent to a light beam emitted from a light source 61 located at the incidence position. The light beam 55 is propagated for an extra distance corresponding to one back-and-forth travel within the dispersion section 13. Accordingly, when observed from the emission side, the light beam 55 is equivalent to a light beam emitted from a light source 62 which is located farther than the light source 61 by an amount equal to the thickness of two parallel flat plates. The difference in distance between the propagation paths of the light beams 54 and 55 is 2t cos φ.

Provided the wavelength of the light beams 54 and 55 is λ and the order of generated interference fringe is m, the condition for intensifying the two light beams 54 and 55 at infinity is given by $$2nt\cos\phi = m\lambda \quad (5)$$

in consideration of the refractive index n of the parallel flat plate 13*a*. The left side of the equation (5) indicates the optical path difference and the right side of same indicates the interference condition (condition for bright fringe). With respect to the same order, a plurality of light beams with different wavelengths are compared, then φ decreases with increase in wavelength.

Figure 8:
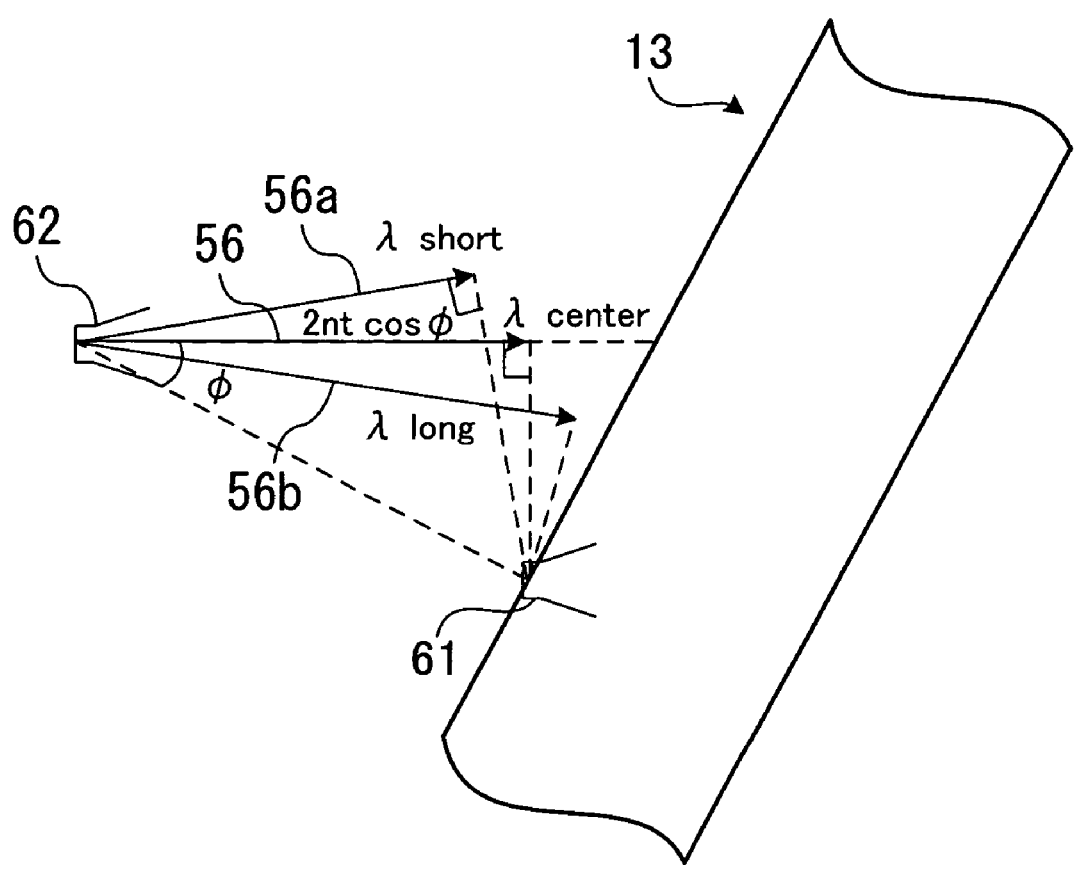
FIG. 8 is a diagram showing angle differences according to wavelengths.

FIG. 8 shows angle differences according to wavelengths. As seen from FIG. 8, a light beam 56*a* with a shorter wavelength than a light beam 56 shows an increased φ while a light beam 56*b* with a longer wavelength shows a decreased φ.

Angle dispersion, which is a measure of the dispersion performance of the dispersion section 13, can be obtained by using equation (5). Namely, if the angle φ is within the range of linear approximation, the relationship $$d\phi = -\cos\phi \cdot \frac{d\lambda}{\lambda} \quad (6)$$
$$\approx -\frac{1}{\phi}\cdot\frac{d\lambda}{\lambda}$$

holds. Further, using the expression (4) provides $$\frac{d\Phi}{d\lambda} \approx -\frac{n^2}{\lambda\Phi} \quad (7)$$

Now, the traveling direction of light reflected by the reflecting mirror used in the conventional VIPA variable dispersion compensator will be considered.

Provided the curvature of the reflecting mirror is C(y), the inclination h(y) of the mirror is given by $$h(y) = \frac{d\,c(y)}{d\,y} \quad (8)$$

The function C(y) indicative of the curvature of the reflecting mirror is determined such that the group delay time characteristic (group delay time difference relative to wavelength difference) shows a linear function.

The reflection angle of light will be now considered by tracing a light beam with a single wavelength emitted from the dispersion section 13 and reflected by the reflecting mirror.

Figure 9:
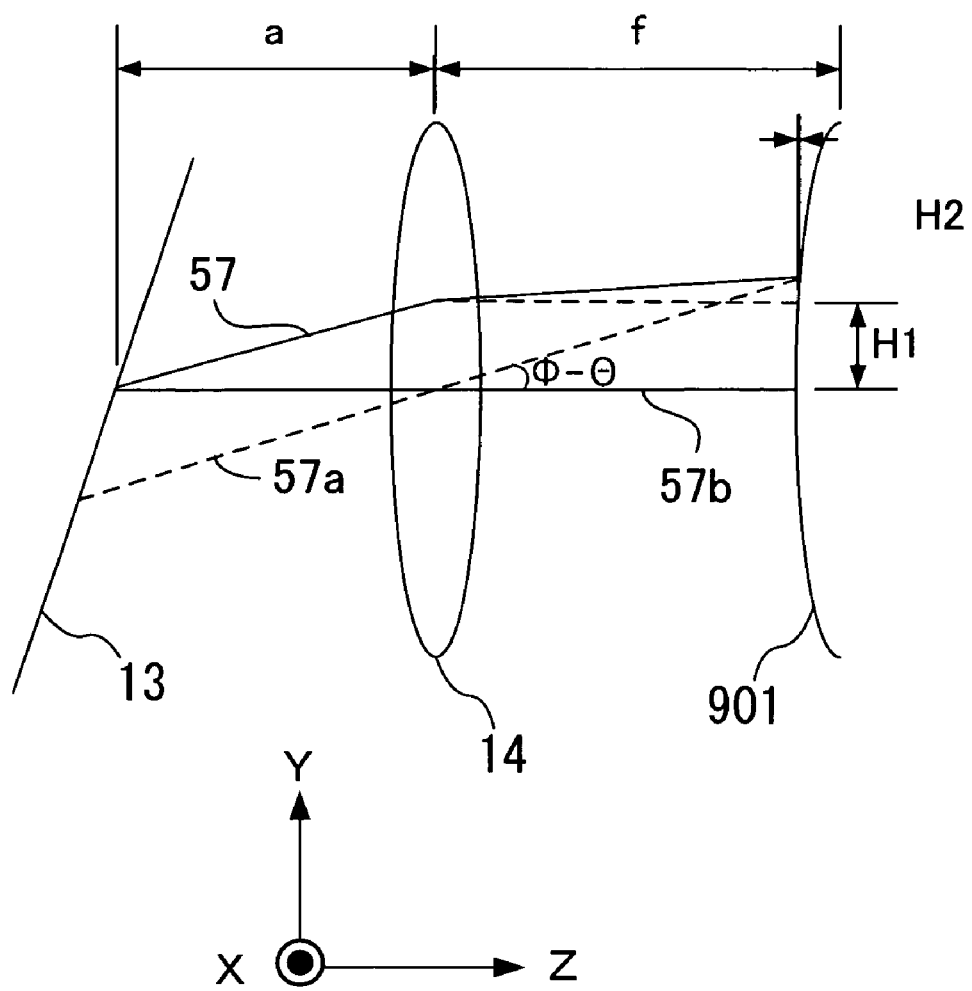
FIG. 9 is a diagram illustrating reflection angles.

FIG. 9 illustrates reflection angles. It is assumed that a light beam 57 is emitted from a point where a line 57*b* passing through the center of the focusing lens 14 and parallel with the Z axis intersects with the dispersion section 13. The light beam 57 passes through the focusing lens 14 and reaches a reflecting mirror 901. A dashed line passing through the center of the focusing lens 14 is an auxiliary line 57*a* parallel with the light beam 57 falling on the focusing lens 14.

A light beam is not refracted when passed through the center of the focusing lens 14. However, the light beam 57 passes through a region of the focusing lens 14 other than the center; therefore, the beam 57 is refracted and focused on the reflecting mirror 901. Thus, parallel beams of light are focused on the same point.

Provided the distance from the dispersion section 13 to the focusing lens 14 is a and the distance from the focusing lens 14 to the reflecting mirror 901 is f, a difference H1 in the Y-axis direction between the position of incidence of the light beam 57 on the focusing lens 14 and the center of the focusing lens 14 is given by $$H1 = a\cdot\tan(\Phi-\theta) \approx a(\Phi-\theta) \quad (9)$$

A difference H2 in the Y-axis direction between the emission position of the light beam 57 from the focusing lens 14 and the incidence position of the beam 57 on the reflecting mirror 901 is $$H2 = f\tan(\Phi - \Theta) - a\tan(\Phi - \Theta) \quad (10)$$
$$\approx f(\Phi - \Theta) - a(\Phi - \Theta)$$
$$= (f - a)(\Phi - \Theta)$$

The behavior of light reflected by the reflecting mirror 901 will be now considered.

Figure 10:
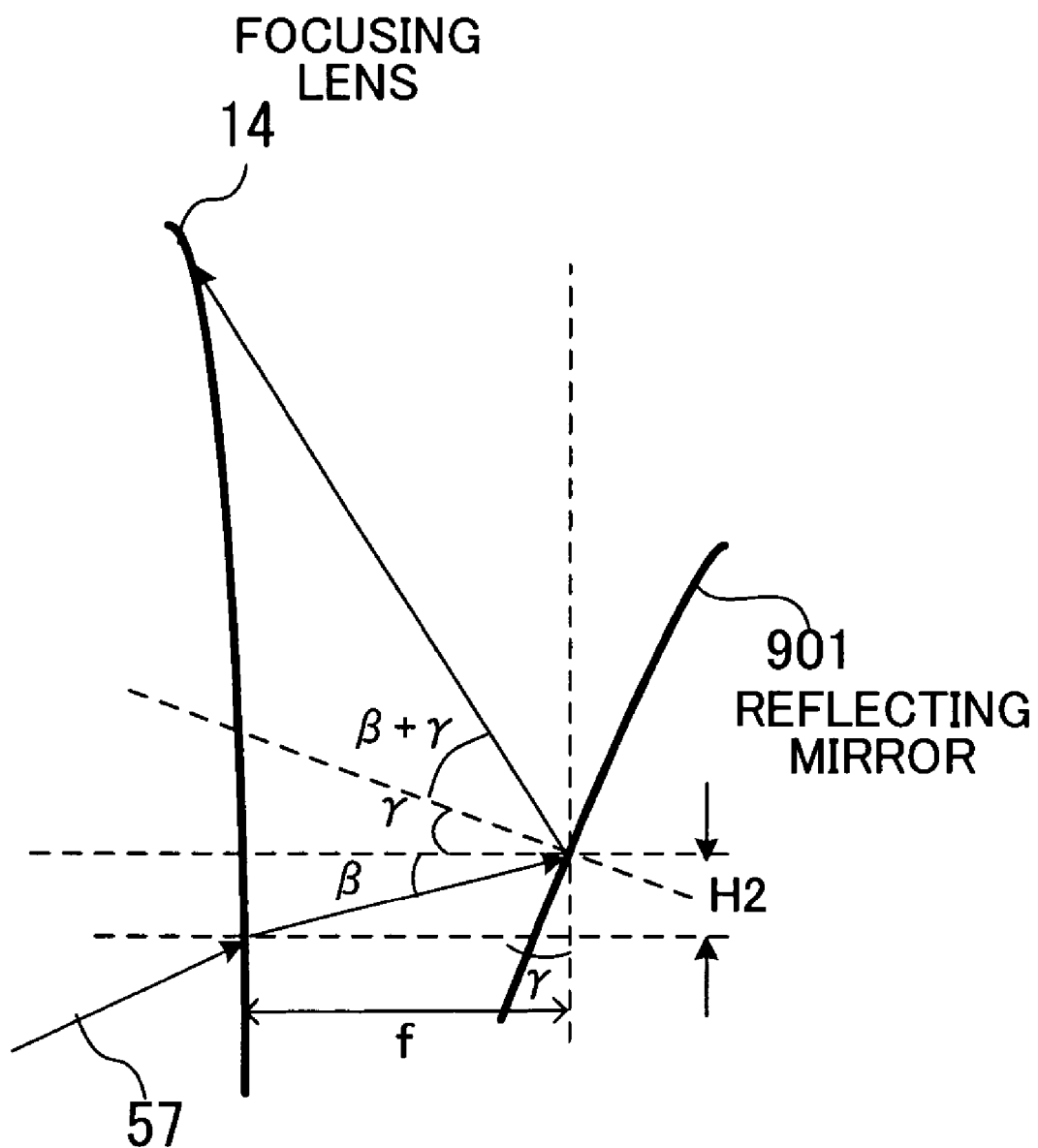
FIG. 10 is diagram illustrating the angular relationship of light beams incident on and reflected from a reflecting mirror.

FIG. 10 illustrates the angular relationship of light beams incident on and reflected from the reflecting mirror. It is assumed that the light beam 57 emitted from the focusing lens 14 is inclined at an angle β with respect to the Z axis, and that a surface region of the reflecting mirror 901 where the light beam 57 falls on the mirror 901 is inclined at an angle γ with respect to the Y axis. The angle γ can be expressed as follows:

$$\gamma \approx \tan\gamma \approx h(y) \quad (11)$$

The angle β can be expressed as follows:

$$\beta \approx \tan\beta \quad (12)$$
$$= \frac{H2}{f}$$
$$= \frac{(f-a)\cdot(\Phi-\Theta)}{f}$$

From the above, the reflection angle of the light beam 57 reflected by the reflecting mirror 901 can be obtained. The present invention uses the transmitting lens 1 in place of the reflecting mirror 901, and therefore, the shape of the transmitting lens 1 may be designed such that the light beam 57 is emitted at the same angle as the angle of reflection of the beam by the reflecting mirror 901 (but in opposite directions along the Z axis).

It is assumed that the transmitting lens 1 has a refractive index n1. Then, an incidence surface shape Z(y) is obtained by which the light beam 57 incident on the transmitting lens 1 is refracted at such a refracting angle as to travel thereafter in a direction parallel to the optical axis (Z axis).

Figure 11:
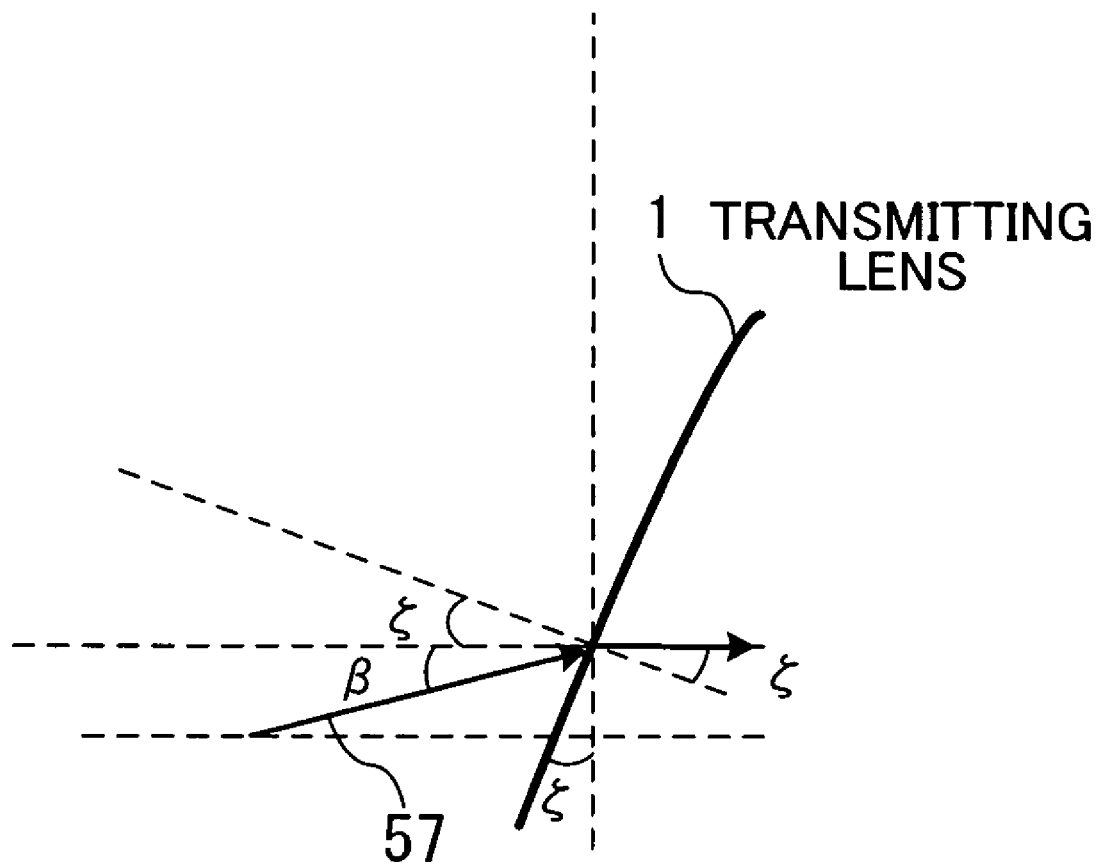
FIG. 11 is a diagram showing the manner of how light is refracted at the incidence side of a transmitting lens.

FIG. 11 shows the manner of how light is refracted at the incidence side of the transmitting lens. In FIG. 11, the traveling direction of the light beam 57 is identical with that shown in FIG. 10. Provided the refracting angle (angle between the refracted light beam and a normal line passing through the incidence position) is ζ, the relationship of $$\sin(\beta+\zeta)=n1\sin\zeta \quad (13)$$

stands in accordance with Snell's law. The angle is very small and thus linearly approximated, then $$\beta+\zeta=n1\zeta \quad (14)$$

This equation is modified to be a variable of y, by using y=f(Φ−θ) and the equation (14), then $$\frac{dZ(y)}{dy} = \frac{1}{n1-1}\frac{(f-a)}{f^2 y} \quad (15)$$

With the differential of Z(y) approximated to ζ, the equation (15) is solved for Z(y), then $$Z(y) = \frac{1}{n1-1}\frac{(f-a)}{f^2}\log y \quad (16)$$

In this manner, the incidence surface shape can be obtained whereby the light beam 57 incident on the transmitting lens 1 can be refracted in a direction parallel to the optical axis.

Where the angle is measured from the optical axis in such a way that the angle increases in a clockwise direction, it is necessary that, from FIG. 11, light should be emitted from the emission surface of the transmitting lens 1 in the direction of $$\beta + 2\gamma = \frac{(f-a)(\Phi-\Theta)}{f} + 2h(y) \quad (17)$$

Here, a model is considered wherein light is incident on the emission surface in a direction parallel to the Z axis.

Figure 12:
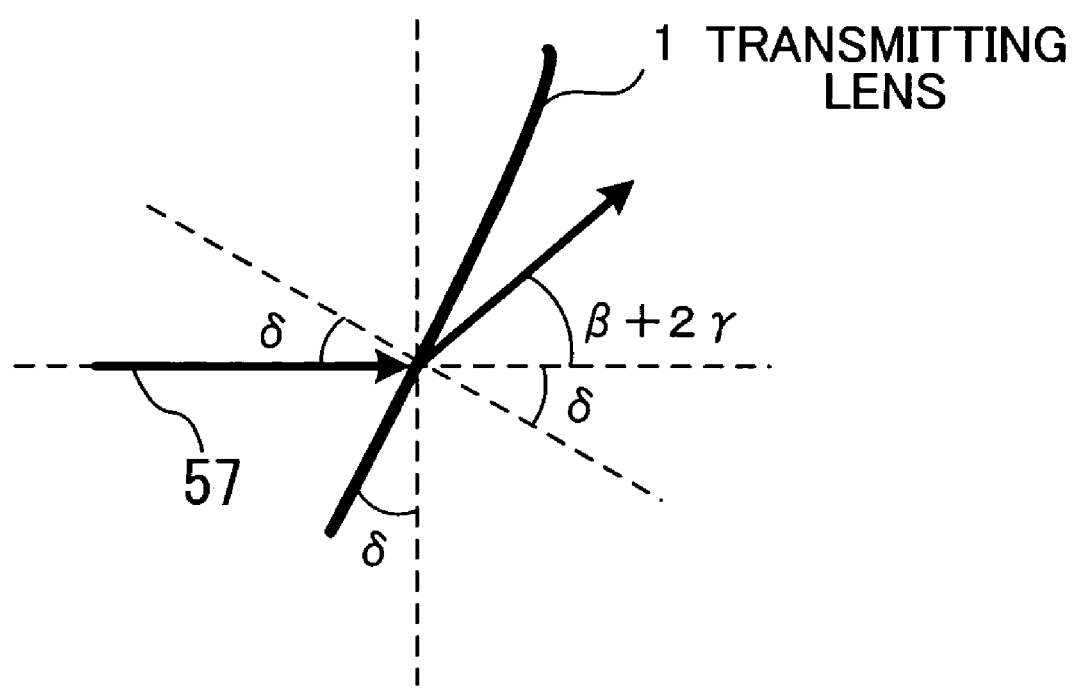
FIG. 12 is a diagram showing the manner of how light is refracted at the emission side of the transmitting lens.

FIG. 12 shows the manner of how light is refracted at the emission side of the transmitting lens. The light beam 57 transmitted through the transmitting lens 1 is refracted at the emission surface. At this time, the light beam needs to be emitted in the direction indicated by the equation (17). In order for the light beam to be emitted in such a direction, it is necessary that the relationship of $$n1\sin\delta = \left(\frac{(f-a)(\Phi-\Theta)}{f} + 2h(y)\right) \quad (18)$$

should be fulfilled, where n1 is the refractive index of the transparent material at the emission surface and 6 is the incidence angle.

In FIG. 12, δ is equivalent to the inclination of the transmitting lens 1 inclined at δ with respect to the optical axis, and thus the emission surface shape X(y) of the transparent material can be expressed as $$\frac{dX(y)}{dy} \approx \delta \quad (19)$$

From the relationship y=f(Φ−θ) and the fact that h(y) is the result of differentiation of the reflecting mirror shape C(y), the equation (18) can be reduced to $$\frac{dX(y)}{dy} = \frac{1}{(n1-1)}\left\{\frac{(f-a)}{f^2 y} + 2\frac{dC(y)}{dy}\right\} \quad (20)$$

This equation is solved, then $$X(y) = \frac{1}{(n1-1)}\left\{\frac{(f-a)}{f^2}\log y + 2C(y)\right\} \quad (21)$$

The shape of the emission surface may be determined so as to fulfill the relationship of the equation (21).

The foregoing is the concept of design for the transparent material. The reflecting mirror shape C(y) is determined such that the group delay time characteristic shows a linear function (the group delay time characteristic is expressed as a straight line on a graph whose horizontal axis indicates wavelength difference and whose vertical axis indicates group delay time difference) Accordingly, the emission surface shape is determined in accordance with the equation (21), whereby the VIPA variable dispersion compensator of this embodiment can be imparted a group delay characteristic showing a linear function.

The aforementioned example is designed such that light is propagated through the transmitting lens 1 in a direction parallel to the optical axis. It is, however, apparent that the transmitting lens may be configured in different ways, since what is essential is that the light emitted from the transmitting lens 1 be directed as desired.

In this manner, the amount of dispersion can be controlled by the shape of the emission side of the transmitting lens 1. Accordingly, by continuously varying the coefficient part of the shape function, represented by C(y), in the X-axis direction of the transmitting lens 1, it is possible to adjust the refracting angle of light emitted from the transmitting lens 1 in accordance with the light incidence position. For example, the group delay time characteristic which is dependent on the refracting angle is adjusted so as to show a linear function whose inclination (amount of change in group delay time per unit wavelength difference) continuously varies along the transmitting lens 1 in the X-axis direction.

Figure 13A:
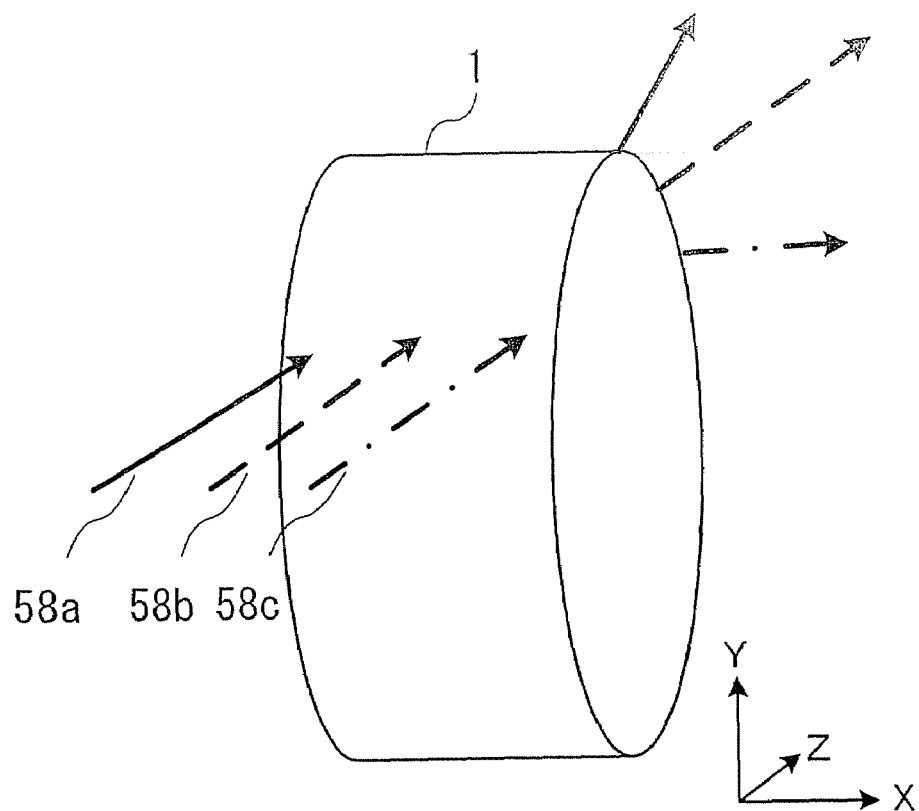
Figure 13B:
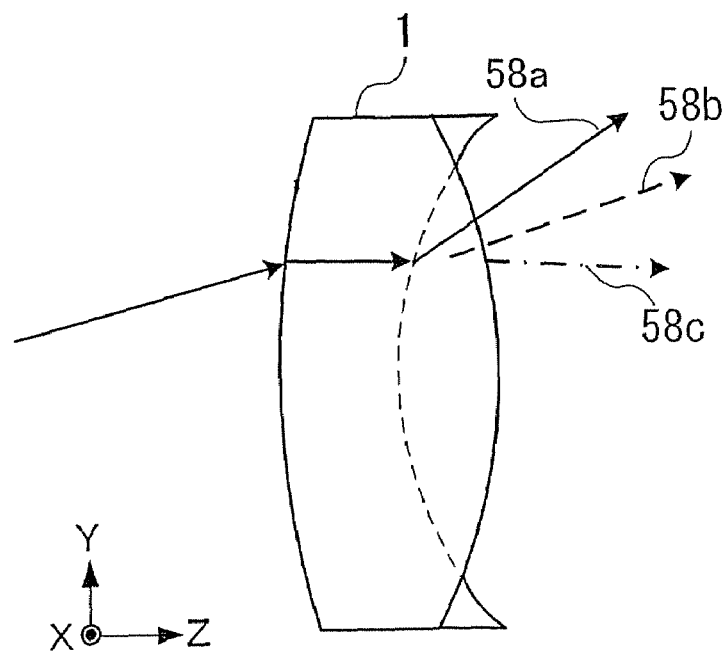

FIGS. 13A and 13B exemplify angles of refraction according to incident positions of light on the transmitting lens, wherein FIG. 13A is a perspective view of the transmitting lens, and FIG. 13B is a side view of the transmitting lens.

FIG. 13A shows three optical axes 58a, 58b and 58c of light beams incident on the transmitting lens 1. The incidence positions of the optical axes 58a, 58b and 58c on the transmitting lens 1 are shifted from one another in the X-axis direction; however, the traveling directions of the optical axes 58a, 58b and 58c are the same and also their incidence positions on the transmitting lens 1 along the Y axis are the same. Because of the difference in the incidence position of the optical axes 58a, 58b and 58c along the X axis, emitted light beams are propagated in different directions.

In the transmitting lens 1 shown FIG. 13B, a far side of the lens as viewed in the figure (negative side of the X axis) has an optical characteristic similar to that of a diverging lens, the degree of divergence lessens toward the near side, and the nearest side of the lens (positive side of the X axis) has an optical characteristic similar to that of a converging lens. In this case, the light beam 58a incident on the transmitting lens 1 at the negative side of the X axis is propagated through the lens 1 in a horizontal direction (parallel to the Z axis) and then refracted in a positive direction of the Y axis. The light beam 58b incident on the transmitting lens 1 near the center thereof is propagated through the lens 1 in a horizontal direction (parallel to the Z axis) and then emitted without being refracted. The light beam 58c incident on the transmitting lens 1 at the positive side of the X axis is propagated through the lens 1 in a horizontal direction (parallel to the Z axis) and then refracted in a negative direction of the Y axis.

The transmitting lens 1 designed in this manner is moved in the X-axis direction within the VIPA variable dispersion compensator, whereby the amount of divergence (or the amount of convergence) of light emitted from the lens 1 can be adjusted.

Figure 14:
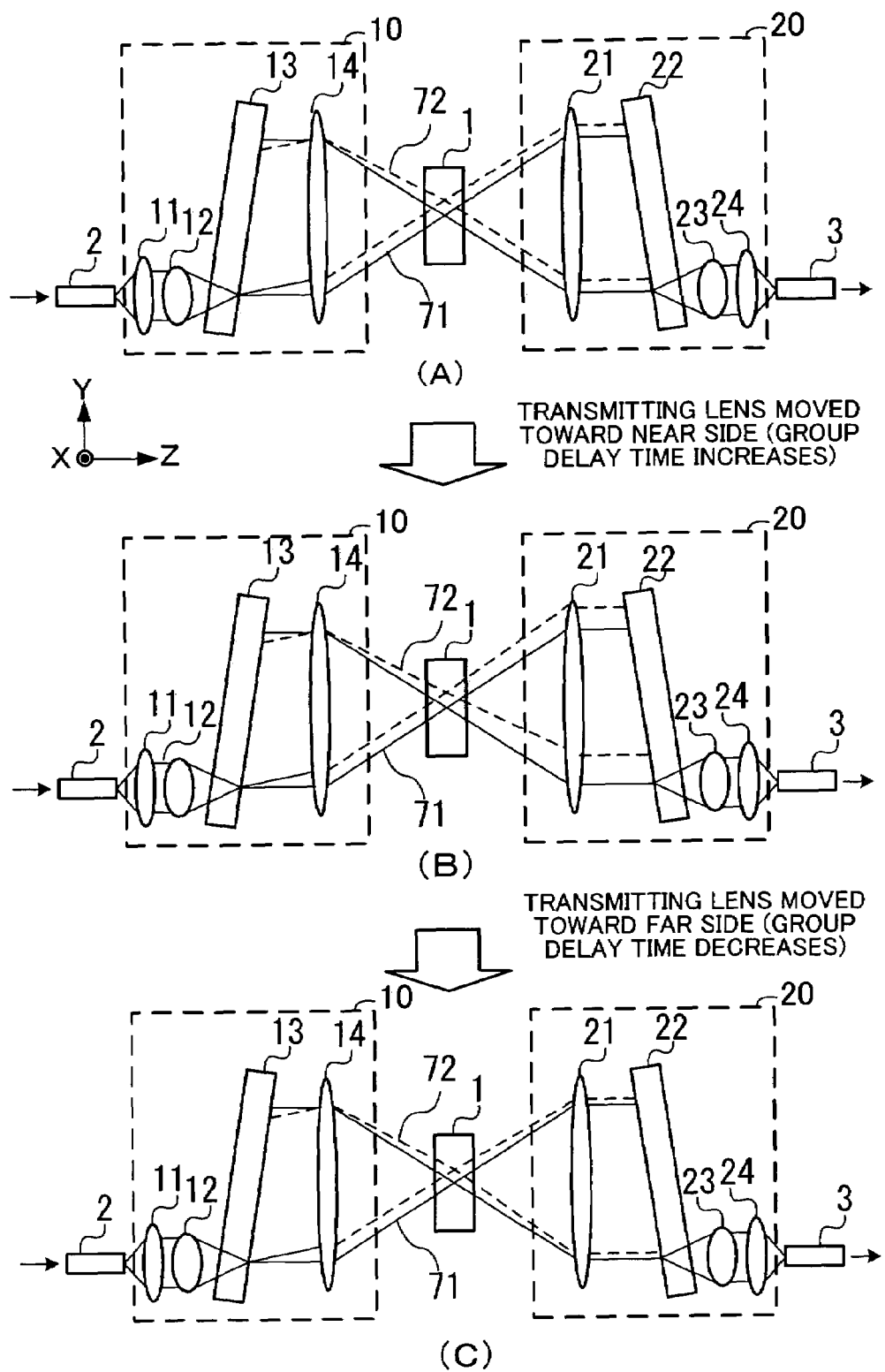
FIG. 14 illustrates the manner of how light is dispersed according to the position of the transmitting lens, wherein part (A) of FIG. 14 is a diagram showing the case where the transmitting lens is arranged such that light is incident on the center of the transmitting lens with respect to an X-axis direction, part (B) of FIG. 14 is a diagram showing the case where the transmitting lens is arranged such that light is incident on the far side of the transmitting lens with respect to the X-axis direction, and part (C) of FIG. 14 is a diagram showing the case where the transmitting lens is arranged such that light is incident on the near side of the transmitting lens with respect to the X-axis direction.

FIG. 14 illustrates the manner of how light is dispersed according to the position of the transmitting lens, wherein part (A) of FIG. 14 is a diagram showing the case where the transmitting lens is arranged such that light is incident on the center of the transmitting lens with respect to the X-axis direction, part (B) of FIG. 14 is a diagram showing the case where the transmitting lens is arranged such that light is incident on the far side of the transmitting lens with respect to the X-axis direction, and part (C) of FIG. 14 is a diagram showing the case where the transmitting lens is arranged such that light is incident on the near side of the transmitting lens with respect to the X-axis direction. In FIG. 14, a light beam 71 indicated by the solid line is incident on the transmitting lens 1 near the center thereof along the Y axis, and a light beam 72 indicated by the dashed line is incident on an upper portion of the transmitting lens 1 with respect to the center thereof along the Y axis.

As shown in part (A) of FIG. 14, the light beams 71 and 72 incident on the transmitting lens 1 are emitted from the lens 1 at respective predetermined angles and then turned to parallel beams by the second focusing lens 21 to be incident on the delay section 22.

If the transmitting lens 1 is moved toward the near side (positive direction of the X axis) as shown in part (B) of FIG. 14, the light beam 72 is incident on a position similar to that of the optical axis 58a shown in FIG. 13A. In this case, the incidence position of the light beam 72 on the delay section 22 is shifted upward, compared with the position before the movement of the transmitting lens 1. Accordingly, the light beam 72 needs to follow a prolonged optical path until it is emitted from the delay section 22, so that the group delay time increases.

On the other hand, if the transmitting lens 1 is moved toward the far side (negative direction of the X axis) as shown in part (C) of FIG. 14, the light beam 72 is incident on a position similar to that of the optical axis 58c shown in FIG. 13A. In this case, the incidence position of the light beam 72 on the delay section 22 is shifted downward, compared with the position before the movement of the transmitting lens 1. Accordingly, the light beam 72 follows a shortened optical path until it is emitted from the delay section 22, so that the group delay time decreases.

Thus, the group delay time can be adjusted by moving the transmitting lens 1. Where the VIPA variable dispersion compensator is connected to an optical fiber, light emerging from the optical fiber shows a degree of chromatic dispersion that varies depending on the transmission path etc. Accordingly, the technician who installs the VIPA variable dispersion compensator shifts the position of the transmitting lens 1 in the X-axis direction to adjust the group delay time, thereby compensating for the chromatic dispersion.

Second Embodiment

In a second embodiment, the transmitting lens has a different exemplary shape.

In the first embodiment, the transparent material is designed such that light is propagated through the transmitting lens 1 in a direction parallel to the optical axis of light incident on the VIPA variable dispersion compensator. What is essential is, however, that light is refracted and emitted from the transmitting lens in the same direction (but opposite sides of the Z axis) as attained by the reflecting mirror of the conventional device. The transmitting lens may therefore be configured differently insofar as it is designed such that light not perpendicular to the optical axis of the incident light is refracted and then emitted in the same direction as attained by the reflecting mirror.

Figure 15:
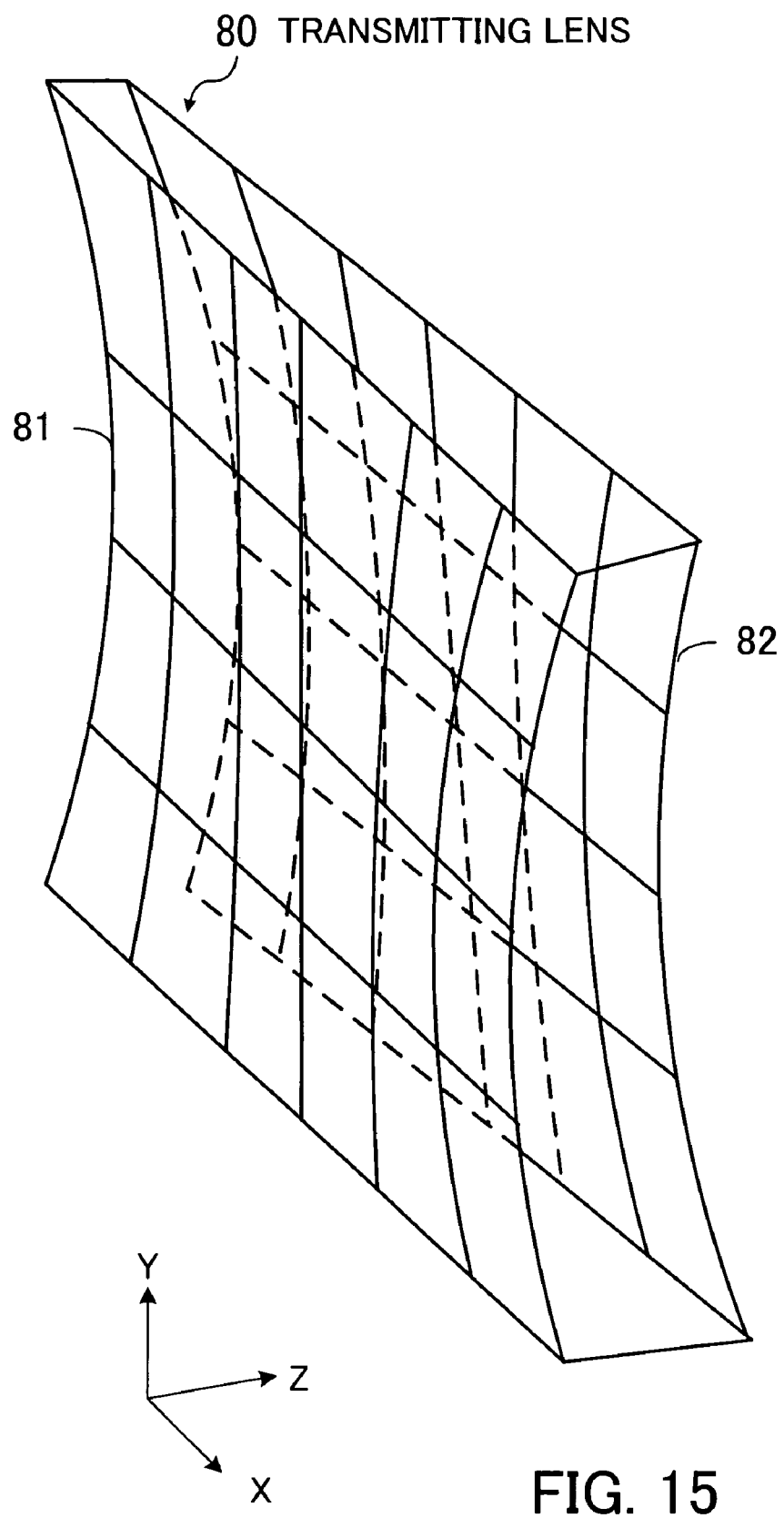
FIG. 15 is a diagram showing an exemplary shape of the transmitting lens.

FIG. 15 shows an exemplary shape of the transmitting lens. A transmitting lens 80 shown in FIG. 15 has aspherical incidence and emission surfaces 81 and 82.

The incidence surface 81 is concaved at one end thereof on the negative side of the X axis, gradually becomes straight and then convex along the positive direction of the X axis, and is convexed at the other end thereof on the positive side of the X axis.

The emission surface 82 is convexed at one end thereof on the negative side of the X axis, gradually becomes straight and then concave along the positive direction of the X axis, and is concaved at the other end thereof on the positive side of the X axis.

In this manner, the contours of the lens are varied along the X-axis direction (moving direction of the transmitting lens), whereby the degree of divergence or convergence can be set differently according to the light incidence position with respect to the X axis.

Third Embodiment

According to a third embodiment, the transmitting lens is moved by a driving motor.

In the first embodiment, the transmitting lens 1 is merely explained as a movable lens; by moving the transmitting lens 1 with the use of a motor or the like, it is possible to control the group delay time by means of an external signal.

Figure 16A:
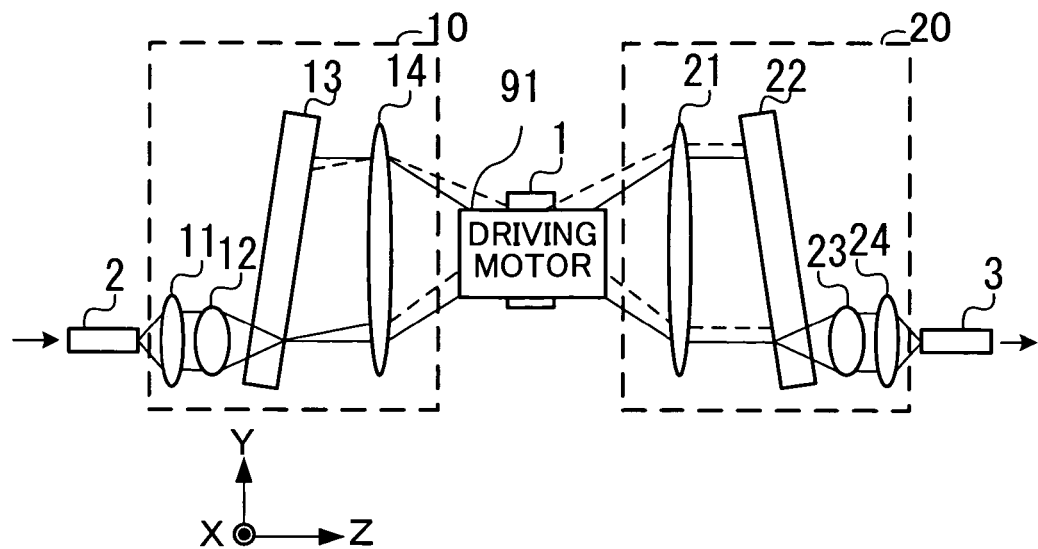
Figure 16B:
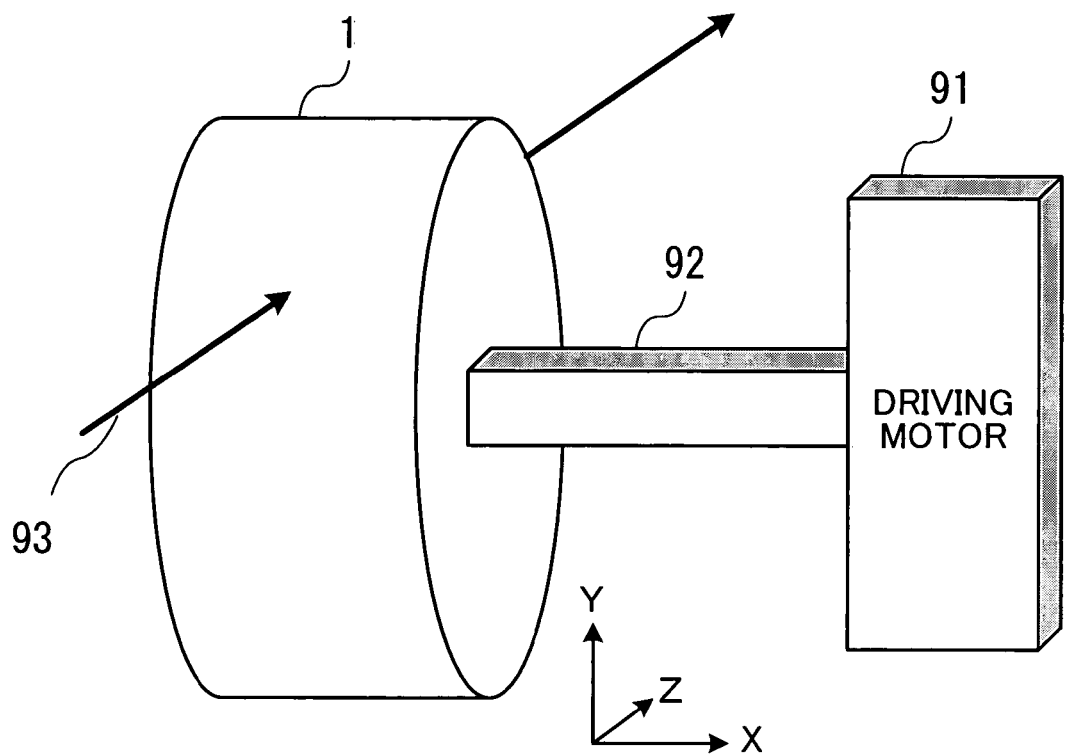
Figure 17:
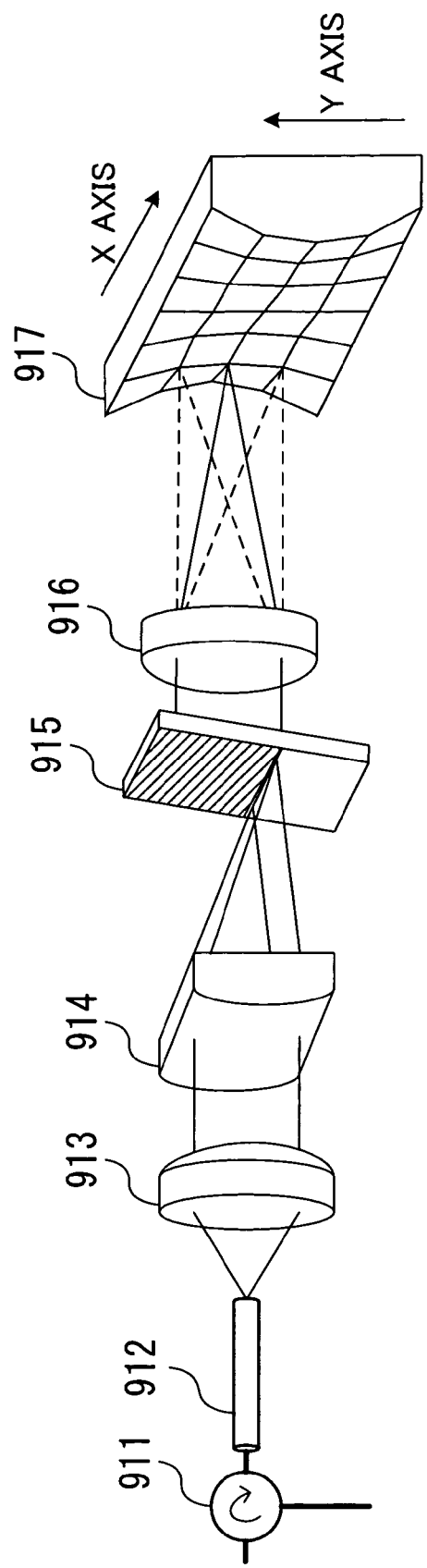
FIG. 17 is a diagram showing an example of a conventional VIPA dispersion compensator.

FIGS. 16A and 16B illustrate a VIPA variable dispersion compensator according to the third embodiment, wherein FIG. 16A is a diagram showing an entire arrangement, and FIG. 16B is an enlarged view of a transmitting lens driving section. The VIPA variable dispersion compensator of the third embodiment is almost identical with that shown in FIG. 1; therefore, identical reference numerals are used to denote identical elements and description of such elements is omitted.

In the third embodiment, the transmitting lens 1 is coupled to a driving motor 91 for moving the lens 1. The driving motor 91 has a shaft 92 connected to an X-axis side face of the transmitting lens 1. In accordance with a signal input from outside, the driving motor 91 moves the shaft 92 in the X-axis direction. As the shaft 92 moves, the transmitting lens 1 moves in the X-axis direction, thus shifting the incidence position of light 93.

The transmitting lens 1 is thus equipped with the driving motor 91, and accordingly, even in cases where the dispersion of light incident on the VIPA variable dispersion compensator varies with time, the group delay time can be controlled so as to follow up the varying dispersion. Namely, the refracting angle of the transmitting lens 1 continuously changes in the X-axis direction, and therefore, by controlling the movement of the lens 1 in the X-axis direction by means of an external signal, it is possible to perform group delay time control in real time.

In the individual embodiments of the invention described above, the dispersion function and the delay function are accomplished by different optical systems and thus can be individually adjusted with ease. Namely, the dispersion unit 10 is adjusted so as to obtain a desired dispersion function, and the group delay generation unit 20 is adjusted so as to obtain a desired group delay function. Consequently, it is possible to produce with ease a VIPA variable dispersion compensator capable of performing a dispersion compensation function as designed.

Also, the dispersion function can be adjusted independently, so that the free settable range of the dispersion function widens. For example, higher orders of interference fringes may be generated to obtain very high dispersive power (ratio of change in diffraction angle to change in wavelength).

Similarly, the delay function can be adjusted independently, so that the free settable range of the group delay time widens. For example, the group delay time can be increased by increasing the thickness of the delay section 22.

The transmitting lens 1 is configured such that the angle of refracting the incident light varies continuously (or stepwise) in a direction (X-axis direction) perpendicular to the dispersing direction, and accordingly, the group delay time characteristic can be changed by moving the transmitting lens 1 in the X-axis direction. For example, the inclination of the linear function representing the group delay time characteristic may be varied continuously (or stepwise).

Further, the transmitting lens 1 can be moved by the driving motor, and in this case, the group delay time characteristic can be controlled by means of external signal.

Moreover, the dispersion unit 10, the transmitting lens 1 and the group delay generation unit 20 are arranged along the optical axis of light incident on the VIPA variable dispersion compensator, whereby light parallel with the optical axis of the incident light enters the transmitting lens 1. By thus arranging the individual elements along a straight line, it is possible to reduce the overall size of the device.

The foregoing embodiments are illustrative only of the present invention. The present invention can therefore be modified in various ways by those skilled in the art on the basis of the principles of the present invention and without departing from the scope of the invention in the appended claims and their equivalents.

As described above, according to the present invention, the incident light dispersion function is separated from the group delay generation function for subjecting dispersed light beams of respective wavelengths to propagation delay, and the intervening transmitting lens is used to adjust the group delay time to be generated. Accordingly, the amount of dispersion and the group delay time can be adjusted separately, thus making it easy to obtain desired characteristics.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A chromatic dispersion compensation device comprising:
    a dispersion unit for separating incident light into light beams of respective different wavelengths;
    a transmitting lens receiving the light beams from said dispersion unit and outputting the light beams at different angles according to incidence positions of the light beams on the transmitting lens; and
    a group delay generation unit receiving the light beams from said transmitting lens, for adding propagation delays corresponding to incidence positions of the light beams on said group delay generation unit, and outputting the light beams of the different wavelengths;

wherein
a degree of divergence or convergence of the transmitting lens varies in a direction perpendicular to light beams incident and refracted thereon, and
incidence intervals of the light beams on said group delay generation unit changes according to a position of the transmitting lens in said direction which is perpendicular to said light beams incident and refracted.

2. The chromatic dispersion compensation device according to claim 1, wherein said dispersion unit includes
a collimating lens section for focusing the incident light into a predetermined line segment,
dispersion means having an incidence window containing the line segment, for dispersing light incident on the incidence window in a direction perpendicular to the line segment, and
a focusing lens for focusing light dispersed by the dispersion means.

3. The chromatic dispersion compensation device according to claim 2, wherein the dispersion means of said dispersion unit has first and second parallel reflecting surfaces facing each other, the dispersion means admitting light from the line segment defined parallel on one of the first and second reflecting surfaces or on a surface region close thereto so as to fall on the first and second reflecting surfaces while spreading radially in a direction perpendicular to the line segment, and allowing the light to transmit through one of the first and second reflecting surfaces as the light undergoes multiple reflection, such that the output light forms light beams traveling in different directions according to respective wavelengths as a result of interference thereof.

4. The chromatic dispersion compensation device according to claim 1, wherein said group delay generation unit includes
a focusing lens for producing parallel light beams from the light beams of the different wavelengths refracted by said transmitting lens,
delay means arranged across optical paths of the parallel light beams of the different wavelengths produced by the focusing lens, for causing the parallel light beams of the different wavelengths to undergo respective different propagation delays due to differences in optical path length from respective incidence positions up to an emission window thereof, and emitting converged light of the different wavelengths from the emission window, and
a collimating lens section for focusing the light emitted from the delay means on a core of an optical fiber.

5. The chromatic dispersion compensation device according to claim 4, wherein the delay means of said group delay generation unit has first and second parallel reflecting surfaces facing each other, the delay means allowing the light beams of the different wavelengths to enter through one of the first and second reflecting surfaces, and allowing the light beams of the different wavelengths to be propagated to the emission window defined on one of the first and second reflecting surfaces or on a surface region close thereto while causing the light beams to undergo multiple reflection, such that the converged light of the different wavelengths is emitted from the emission window.

6. The chromatic dispersion compensation device according to claim 1, wherein said dispersion unit focuses the light beams of the different wavelengths on a straight line, and
said transmitting lens is arranged on the straight line and has an optical characteristic such that the light beams of the different wavelengths are refracted at respective predetermined refracting angles varying depending on positions on the straight line.

7. The chromatic dispersion compensation device according to claim 6, wherein the refracting angles of said transmitting lens at which the light beams of the different wavelengths are refracted depending on respective positions on the straight line are designed such that the refracted light beams of the different wavelengths are guided to positions where a group delay time characteristic thereof shows a linear function.

8. The chromatic dispersion compensation device according to claim 6, wherein said transmitting lens is configured such that a light beam focused on any point on the straight line is refracted at a different angle depending on an incidence position thereof along a direction perpendicular to the straight line.

9. The chromatic dispersion compensation device according to claim 8, wherein said transmitting lens is configured such that a linear function representing a group delay time characteristic to be generated thereby has a different inclination depending on the incidence position along the direction perpendicular to the straight line.

10. The chromatic dispersion compensation device according to claim 8, wherein said transmitting lens is movable in directions perpendicular to the straight line on which the light beams of the different wavelengths are focused.

11. The chromatic dispersion compensation device according to claim 10, further comprising a driving motor operative in response to an externally input signal to move said transmitting lens in directions perpendicular to the straight line on which the light beams of the different wavelengths are focused.

12. A chromatic dispersion compensation method for compensating for chromatic dispersion, comprising:
providing a transmitting lens with a degree of divergence or convergence that varies in a direction perpendicular to light beams incident and refracted thereon;
separating incident light into light beams of respective different wavelengths along the direction;
refracting, by using the transmitting lens, the light beams of the different wavelengths at different refracting angles according to respective incidence positions of the light beams of the different wavelengths;
causing the light beams of the different wavelengths to undergo propagation delays corresponding to the respective different refracting angles of the transmitting lens; and
moving the transmitting lens in the direction perpendicular to the incident and refracted light beams to adjust the delays of the light beams.

* * * * *